(12) United States Patent
Lu et al.

(10) Patent No.: US 11,867,820 B2
(45) Date of Patent: Jan. 9, 2024

(54) MIRROR ADJUSTING DEVICE, REFLECTING ASSEMBLY, LIDAR, AND INTELLIGENT DRIVING APPARATUS

(71) Applicant: SUTENG INNOVATION TECHNOLOGY CO., LTD., Shenzhen (CN)

(72) Inventors: Pan Lu, Shenzhen (CN); Yunbing You, Shenzhen (CN); Di Yang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/094,984

(22) Filed: Jan. 9, 2023

(65) Prior Publication Data
US 2023/0161046 A1 May 25, 2023

Related U.S. Application Data

(63) Continuation of application No. PCT/CN2020/101422, filed on Jul. 10, 2020.

(51) Int. Cl.
*G01S 17/931* (2020.01)
*G01S 7/497* (2006.01)

(52) U.S. Cl.
CPC .......... *G01S 17/931* (2020.01); *G01S 7/4972* (2013.01)

(58) Field of Classification Search
CPC .... G01S 17/931; G01S 7/4817; G01S 7/4813; G01S 13/931; G01S 17/02; G01S 7/4972;

(Continued)

(56) References Cited

U.S. PATENT DOCUMENTS 3,800,619 A 4/1974 McIntyre
5,377,948 A * 1/1995 Suman ..................... B60R 1/04
248/549

(Continued)

FOREIGN PATENT DOCUMENTS

CN 201220631 Y 4/2009
CN 102729897 A 10/2012
(Continued)

OTHER PUBLICATIONS

International Search Report issued in corresponding International Application No. PCT/CN2020/101422, dated Apr. 12, 2021, 7 pages.

*Primary Examiner* — Olumide Ajibade Akonai
(74) *Attorney, Agent, or Firm* — BAYES PLLC

(57) ABSTRACT

A mirror adjusting device, a reflecting assembly, a LiDAR, and an intelligent driving apparatus are provided. The mirror adjusting device includes a mounting bracket, a fixing bracket, and an elastic assembly. The mounting bracket includes a mirror mounting structure for mounting a mirror at one side and an adjusting part at the opposite side. The adjusting part includes a first curved wall protruding in a direction away from the mirror mounting structure, and the middle of the first curved wall is provided with a connecting structure. The fixing bracket includes a groove at one side and a through hole on the other side. The groove includes a second curved wall recessed toward the other side of the fixing bracket, and the first curved wall abuts against the second curved wall. The elastic assembly includes an elastic member and a connecting member.

6 Claims, 27 Drawing Sheets

(58) Field of Classification Search
CPC .......... G02B 26/105; G02B 2027/0154; G02B 27/0149; G02B 7/182; G02B 7/1821; B60R 11/04; B60R 1/12; B60R 1/04; B60R 1/06; B60R 1/00; B60R 1/066; B60R 1/072; B60R 1/074; B60R 1/0605; B60R 1/061; B60R 2011/0026
See application file for complete search history.

(56) References Cited

U.S. PATENT DOCUMENTS

| | | | |
|---|---|---|---|
| 11,493,604 B2* | 11/2022 | Pan | G01S 7/4817 |
| 2014/0153123 A1* | 6/2014 | Hancock | B60R 1/06 |
| | | | 359/872 |
| 2015/0329053 A1* | 11/2015 | Lee | B60R 1/04 |
| | | | 359/865 |

FOREIGN PATENT DOCUMENTS

| | | | |
|---|---|---|---|
| CN | 207573503 U | | 7/2018 |
| CN | 207773015 U | | 8/2018 |
| CN | 210005776 U | | 1/2020 |
| CN | 111053409 A | * | 4/2020 |

* cited by examiner

MIRROR ADJUSTING DEVICE, REFLECTING ASSEMBLY, LIDAR, AND INTELLIGENT DRIVING APPARATUS

CROSS-REFERENCE TO RELATED APPLICATION

The present application is a continuation of International Application No. PCT/CN2020/101422, filed on Jul. 10, 2020, the content of which is incorporated herein by reference in its entirety.

TECHNICAL FIELD

This application relates to the technical field of laser detection, and in particular, to a mirror adjusting device, a reflecting assembly, a LiDAR, and an intelligent driving apparatus.

BACKGROUND

A mirror is a device for reflecting light. The mirror in the prior art has a fixed position and can only reflect light in a single direction. Further, it is troublesome to adjust the position of the mirror.

SUMMARY

This application provides a mirror adjusting device, a reflecting assembly, a LiDAR, and an intelligent driving apparatus. The mirror adjusting device, the reflecting assembly, the LiDAR, and the intelligent driving apparatus can conveniently adjust the position of a mirror so that the mirror can reflect light from different angles.

According to one aspect of this application, a mirror adjusting device is provided, comprising:
 a mounting bracket, provided with a mirror mounting structure for mounting a mirror at one side and an adjusting part at the opposite side, where the adjusting part includes a first curved wall protruding in a direction away from the mirror mounting structure, and the middle of the first curved wall is provided with a connecting structure;
 a fixing bracket, provided with a groove at one side, where the groove includes a second curved wall recessed toward the other side of the fixing bracket, and the other side of the fixing bracket is provided with a through hole penetrating through the second curved wall, and the first curved wall abuts against the second curved wall; and
 an elastic assembly, including an elastic member and a connecting member, where the elastic member abuts against the surface wall of the fixing bracket away from the groove. One end of the connecting member is connected to the elastic member, and the other end passes through the through hole to be connected to the connecting structure.

The adjusting part can rotate about at least two intersecting axes relative to the fixing bracket. During the rotation of the adjusting part relative to the fixing bracket, the elastic member provides the adjusting part with a pressing force against the second curved wall via the connecting member. The pressing force is configured to fix the fixing bracket and the adjusting part.

According to some embodiments of this application, a side of the fixing bracket facing away from the groove is provided with a third curved wall protruding away from the groove, and the elastic member abuts against the third curved wall.

According to some embodiments of this application, the first curved wall is spherical; and/or
 The second curved wall is spherical; and/or
 The third curved wall is spherical.

According to some embodiments of this application, the elastic member includes at least three elastic sheets. One end of each elastic sheet is connected to one end of the connecting member facing away from the adjusting part, and the other end abuts against the third curved wall.

According to some embodiments of this application, the end of each elastic sheet facing away from the connecting member is provided with a contact point protruding toward the third curved wall, respectively, and each contact point abuts against the third curved wall, respectively.

According to some embodiments of this application, the connecting member is a threaded connecting member, and the threaded connecting member is in threaded connection with a connecting structure.

According to some embodiments of this application, the mirror adjusting device further includes:
 a base, connected to the fixing bracket and configured to connect the mirror adjusting device to an external component.

According to some embodiments of this application, the mirror adjusting device further includes:
 a fixing glue, connected to the fixing bracket and the elastic member, and configured to fix the elastic member and the fixing bracket.

A second aspect of this application also provides a reflecting assembly for LiDAR, including:
 a mirror, including a reflecting surface for reflecting laser.
 For the mirror adjusting device of any one of the foregoing, the mirror is connected to a mirror mounting structure, and the reflecting surface is away from the mirror mounting structure.

A third aspect of this application also provides LiDAR, including a foregoing reflecting assembly.

A fourth aspect of this application also provides an intelligent driving apparatus, including a foregoing LiDAR.

In a mirror adjusting device provided by this application, a first curved wall and a second curved wall of a mounting bracket are embedded and abutted. An adjusting part can rotate about at least two intersecting axes relative to a fixing bracket, which gives the adjusting part the ability to adjust air angle in two directions relative to the fixing bracket. The angle change of the adjusting part causes an angle of the mirror mounted on the mirror mounting structure to change relative to the fixing bracket, thus achieving the objective of adjusting the angle of the mirror. Particularly, in the embodiment of this application, during the rotation of the adjusting part relative to the fixing bracket, the elastic member always provides the adjusting part with a pressing force against the second curved wall. This pressing force is configured to fix the relative positions of the adjusting part and the fixing bracket, which allows the mirror to be fixed at any time during the adjustment of the angle of the mirror. There is no need to arrange a positioning device correspondingly, thereby simplifying a fixing step of the mirror.

BRIEF DESCRIPTION OF DRAWINGS

To explain embodiments of this application or the technical solutions in the prior art more clearly, the following briefly introduces the drawings used in the embodiments or the prior art. The drawings in the following description are only some embodiments of this application. The person skilled in the art can obtain other drawings based on these drawings without inventive labor.

DETAILED DESCRIPTION

Figure 1:
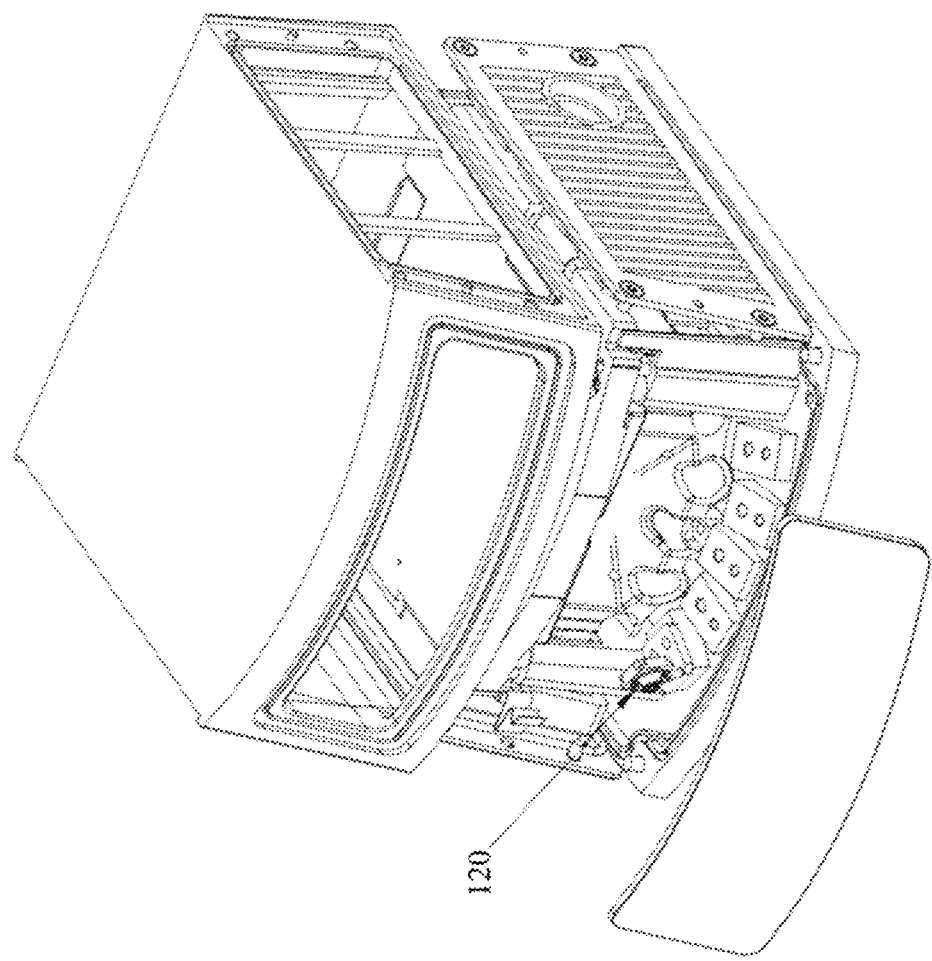
FIG. 1 shows an exploded schematic diagram of a LiDAR in an embodiment of this application.
Figure 2:
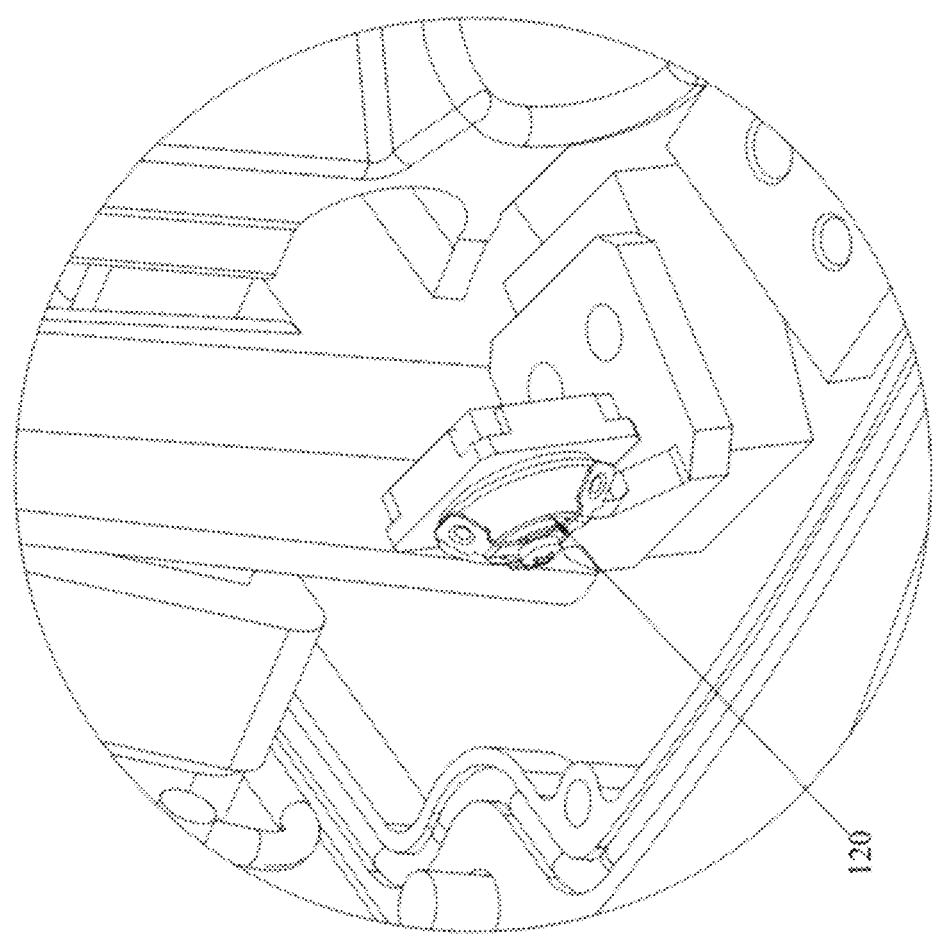
FIG. 2 shows a partially enlarged schematic diagram of FIG. 1.
Figure 3:
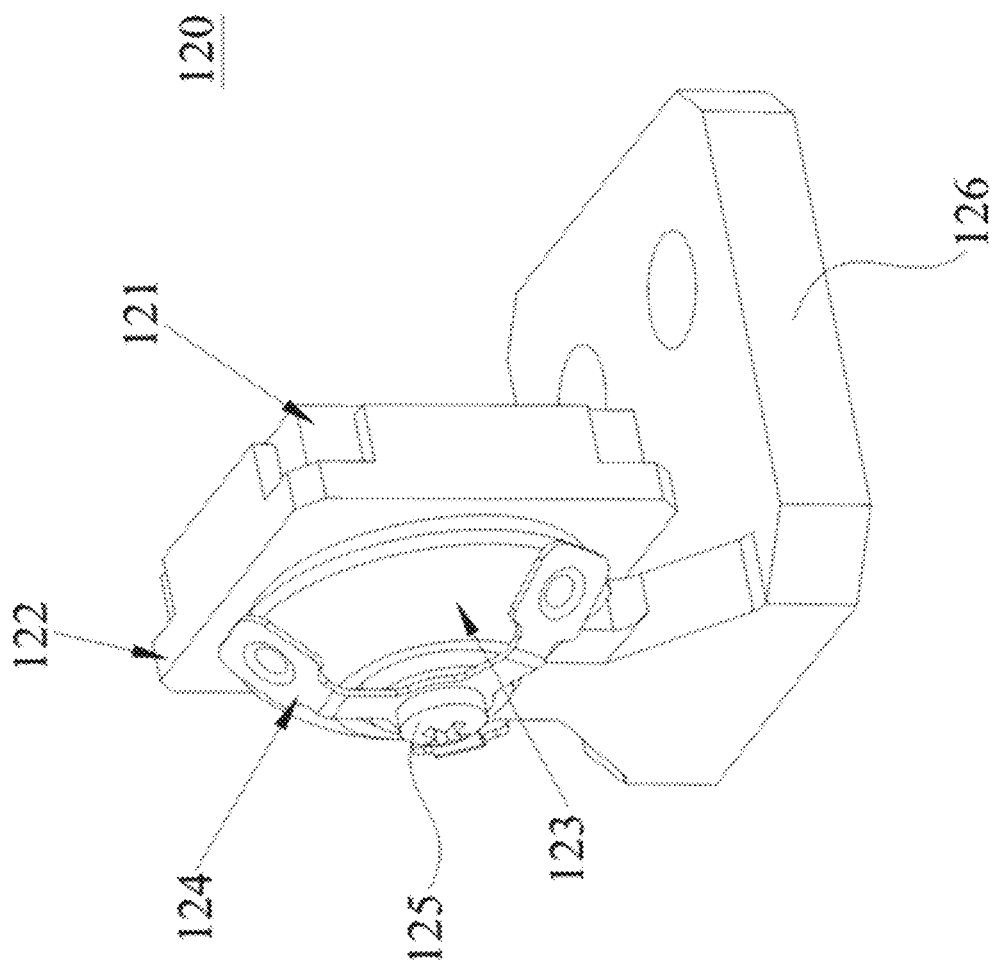
FIG. 3 shows a first perspective diagram of a reflecting assembly according to an embodiment of this application.
Figure 4:
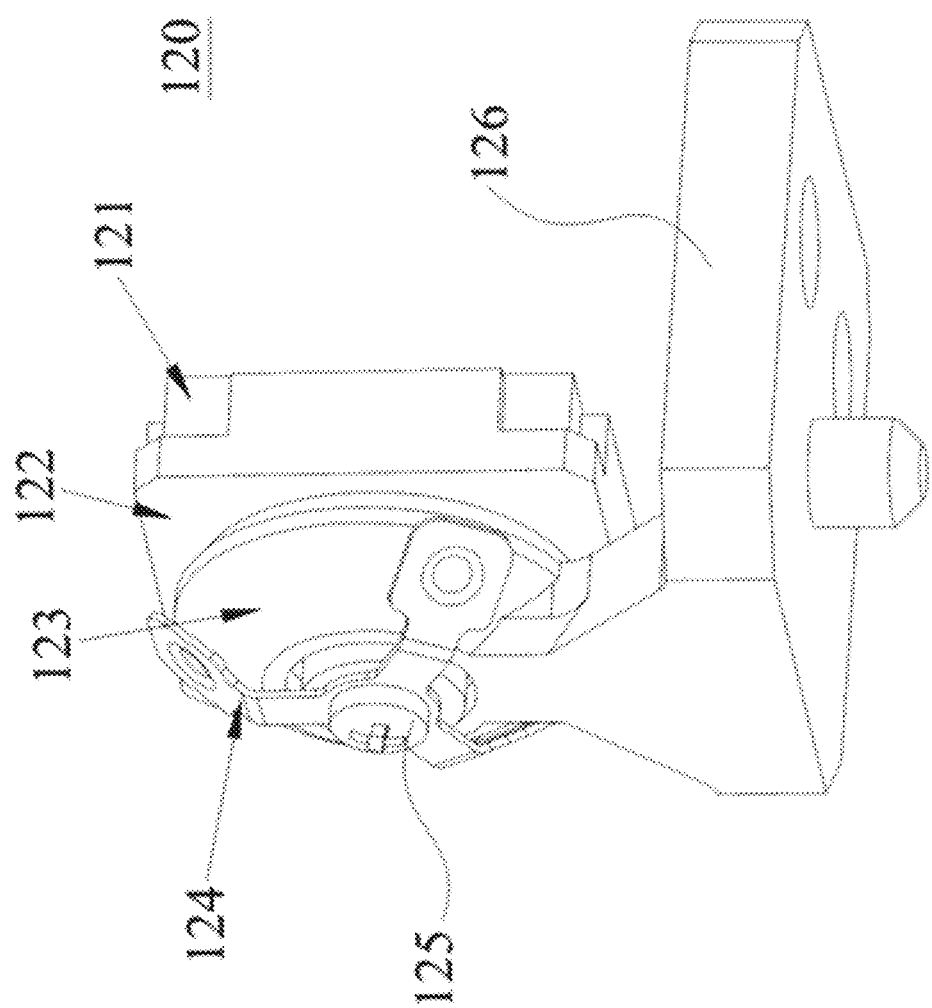
FIG. 4 shows a second perspective diagram of a reflecting assembly according to an embodiment of this application.

In order to make the objectives, technical solutions, and advantages of this application clearer, the following further describes this application in detail with reference to the accompanying drawings and embodiments. It should be understood that the embodiments described herein are only used to explain this application, but not to limit this application.

A mirror is a device for reflecting light. The mirror in the prior art has a fixed position and can only reflect light in a single direction. Further, it is troublesome to adjust the position of the mirror.

An embodiment of this application provides a mirror adjusting device. The mirror adjusting device can easily adjust the angle of the mirror, and the position of the mirror can be fixed immediately after the angle of the mirror is adjusted. The mirror adjusting device can be used in any scene where the mirror angle needs to be adjusted. For example, a vanity mirror, a dressing mirror, etc. For ease of description, this application takes the mirror adjusting device in a LiDAR as an example. It should be noted that the application of the mirror adjusting device in the embodiment of this application is not limited to the technical field of LiDAR.

As shown in FIGS. 1-6, the mirror 121 adjusting device can include a mounting bracket 122, a fixing bracket 123, and an elastic assembly.

One side of the mounting bracket 122 is provided with a mirror mounting structure 1221 for mounting the mirror 121. The mirror mounting structure 1221 is configured to mount and fix the mirror 121. In some embodiments, the mirror mounting structure 1221 can be a suction cup, an adhesive wall for bonding the mirror 121, or a clamping structure for clamping the mirror 121, or the like. A structure for mounting the mirror 121 is long publicized in the prior art, and will not be repeated here. The other side of the mounting bracket 122 opposite to the mirror mounting structure 1221 is provided with an adjusting part. The adjusting part includes a first curved wall 1222 (a convex smooth wall surface) protruding in a direction away from the mirror mounting structure 1221, and a connecting structure 1223 is provided in the middle of the first curved wall 1222. The first curved wall 1222 can be a partial wall surface of an elliptical sphere or a partial wall of a sphere (or the first curved wall 1222 is spherical). In some embodiments, the first curved wall 1222 can be half of the wall surface of the elliptical sphere or half of the wall surface of the sphere.

A groove is provided on one side of the fixing bracket 123. The groove includes a second curved wall 1233 (a concave smooth wall surface) recessed toward the other side of the fixing bracket 123. The groove is configured to be embedded and connected to the adjusting part. After the groove is connected to the adjusting part, the second curved wall 1233 abuts against the first curved wall 1222. The second curved wall 1233 can be a partial wall surface of an elliptical sphere or a partial wall of a sphere (or the second curved wall 1233 is spherical). In some embodiments, the second curved wall 1233 can be half of the wall surface of the elliptical sphere or half of the wall surface of the sphere. The other side of the fixing bracket 123 opposite to the groove is also provided with a through hole 1232 penetrating through the second curved wall 1233, The through hole 1232 can be a round-hole structure, a square-hole structure, or a hole-like structure in other shapes.

The elastic assembly includes an elastic member 124 and a connecting member 125. The elastic member 124 is made of an elastic material, and when the elastic member 124 is deformed within a certain limit, the elastic member 124 can generate an elastic force to return to the original state. The elastic member 124 can be a spring, an elastic sheet 1241, and the like. One end of the elastic member 124 is connected to the connecting member 125, and the other end abuts against the surface wall of the fixing bracket 123 away from the groove. One end of the connecting member 125 is connected to the elastic member 124, and the other end passes through the through hole 1232 to be connected to the connecting structure 1223. When the elastic member 124 is connected to the connecting member 125 and the fixing bracket 123 at the same time, pressure on the fixing bracket 123 can be generated. This pressure can increase friction between the elastic member 124 and the fixing bracket 123, so that the elastic member 124 is fixed to the fixing bracket 123. In addition, the elastic force generated by the elastic member 124 is transferred from the connecting member 125 to the adjusting part, so that the adjusting part presses against the second curved wall 1233 of the groove. Therefore, the adjusting part is fixed in the groove.

In some embodiments, the adjusting part can rotate relative to the fixing bracket 123 about at least two intersecting axes (the two axes can be perpendicular to each other). And during the rotation of the adjusting part relative to the fixing bracket 123, the elastic member 124 provides the adjusting part with a pressing force against the second curved wall 1233 via the connecting member 125. The pressing force is configured to fix the fixing bracket 123 and the adjusting part. That is, during the rotation of the adjusting part relative to the fixing bracket 123, the elastic member 124 always undergoes elastic deformation and generates an elastic force. In addition, the elastic force generated by the elastic member 124 can always fix the adjusting part in the groove. In this way, after the mirror 121 adjusting device is mounted with the mirror 121, the mirror 121 can not only adjust the arrangement angle within a certain range, but also be positioned immediately after adjusting to a set angle, and there is no need to arrange a positioning device correspondingly, which simplifies the fixing step of the mirror 121.

When the mounting bracket 122 moves relative to the fixing bracket 123, the mounting bracket 122 drives the connecting member 125 to move relative to the fixing bracket 123. The connecting member 125 drives the elastic member 124 to move relative to the fixing bracket 123. If the elastic force generated by the elastic member 124 needs to be able to fix the mounting bracket 122 and the fixing bracket 123, the direction of the elastic force needs to be parallel to the direction of an interaction force between the fixing bracket 123 and the adjusting part. When the relative position of the elastic member 124 and the fixing bracket 123 is changed, it is difficult to ensure that the elastic force generated shall be parallel to the direction of an interaction force between the fixing bracket 123 and the adjusting part. In order to solve the foregoing problems, in one embodiment, the side of the fixing bracket 123 away from the groove is provided with a third curved wall 1231 protruding away from the groove, and the elastic member 124 abuts against the third curved wall 1231. In this way, when the elastic member 124 moves relative to the fixing member, the direction of the elastic force generated by the elastic member 124 can be adjusted at any time. The angle change of the adjustment is synchronized with the angle change of the interaction force between the adjusting part and the fixing bracket 123. Such a structure allows the mounting bracket 122 to be more stably fixed to the fixing bracket 123. Likewise, the third curved wall 1231 can be a partial wall of an elliptical sphere or a partial wall of a sphere (or the third curved wall 1231 is spherical). In some embodiments, the third curved wall 1231 can be half of the wall of the elliptical sphere or half of the wall of the sphere.

Figure 5:
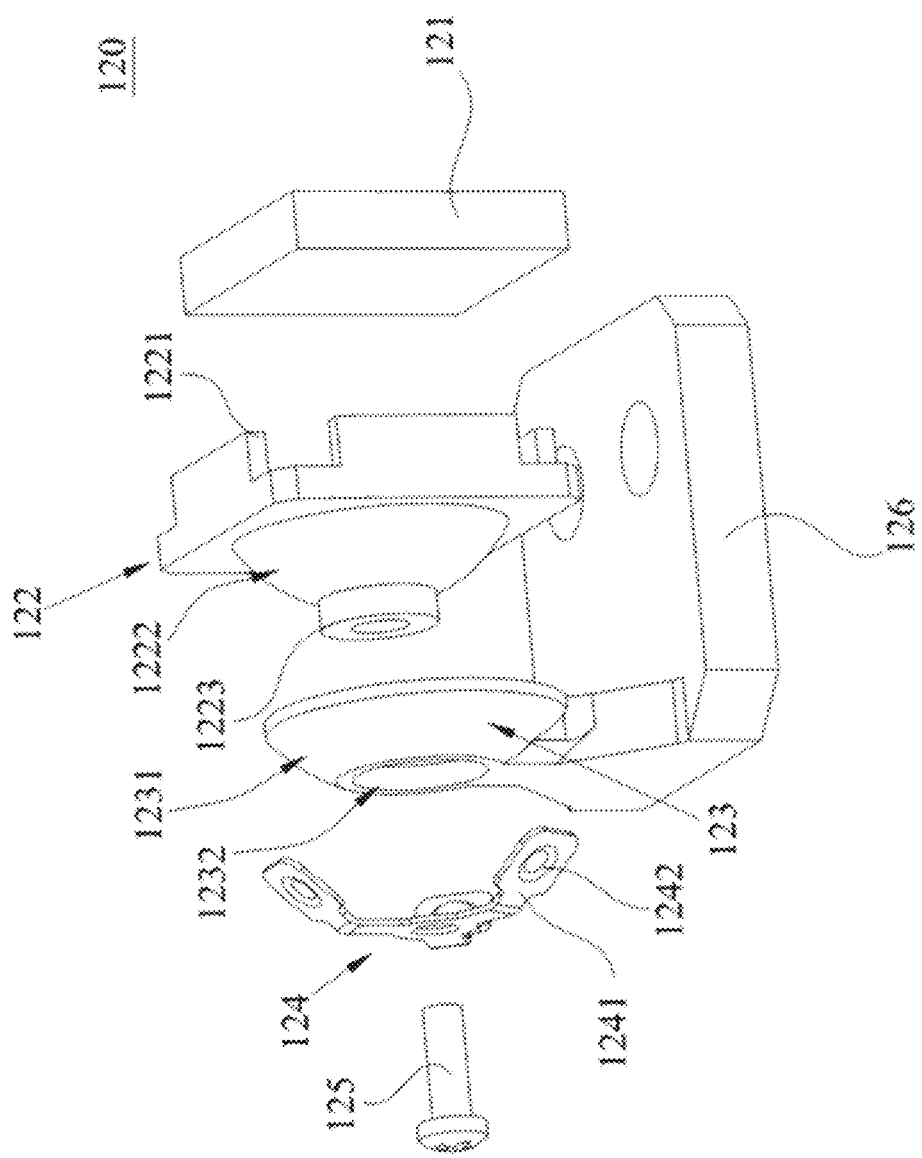
FIG. 5 shows a first exploded schematic diagram of a reflecting assembly according to an embodiment of this application.
Figure 6:
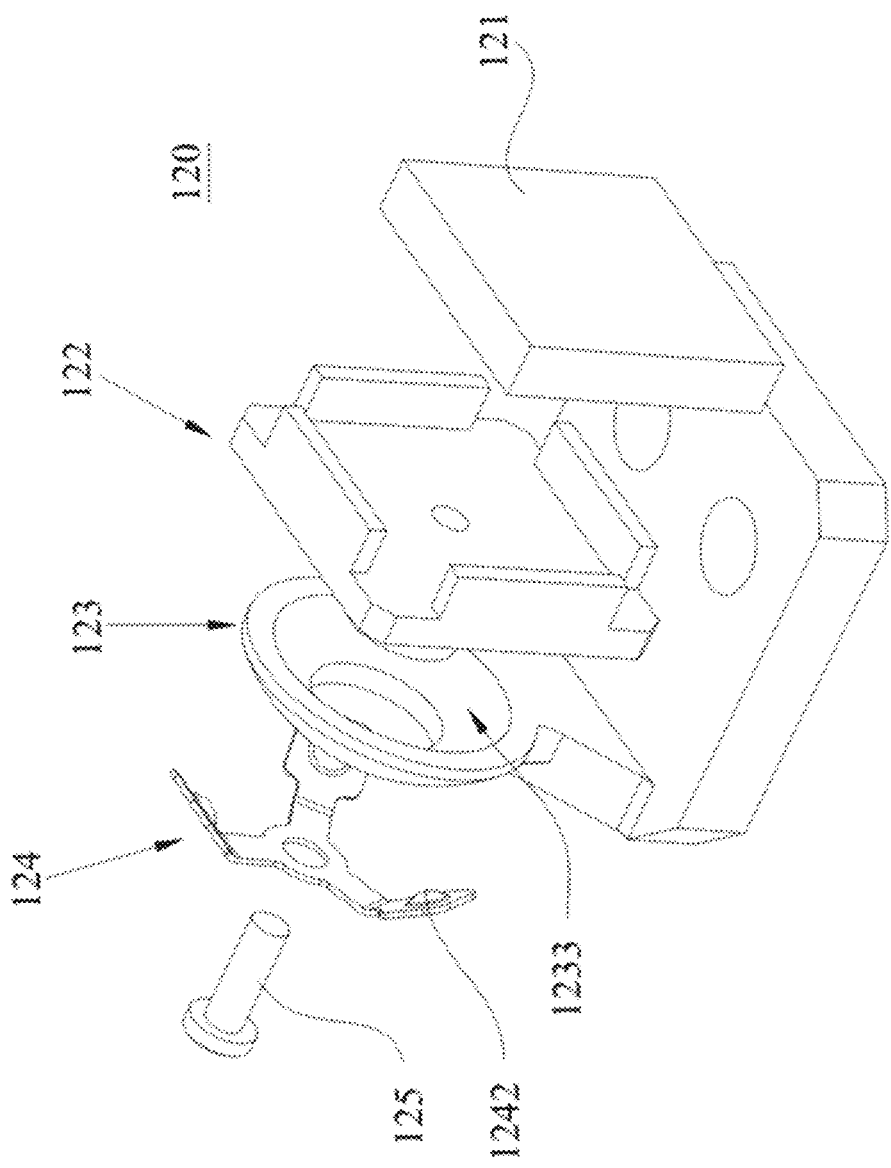
FIG. 6 shows a second exploded schematic diagram of the reflecting assembly according to an embodiment of this application.

As shown in FIG. 5, the elastic member 124 can include at least three elastic sheets 1241. One end of each elastic sheet 1241 is connected to one end of the connecting member 125 facing away from the adjusting part, and the other end abuts against the third curved wall 1231. In some embodiments, the three elastic sheets 1241 can all be elongated, and each elastic sheet 1241 is arranged in a circular array with the connecting member 125 as a center.

Since the elastic member 124 is in contact with the third curved wall 1231, when the elastic member 124 moves relative to the third curved wall 1231, a frictional resistance is generated between the elastic member 124 and the third curved wall 1231, and the frictional resistance hinders the elastic member 124 from moving relative to the third curved wall 1231. In order to solve the foregoing problems, in one embodiment, the end of each elastic sheet 1241 away from the connecting member 125 is provided with a contact point 1242 protruding toward the third curved wall 1231, respectively, and each contact point 1242 abuts against the third curved wall 1231, respectively. The elastic member 124 abuts against the third curved wall 1231 by the contact point, thereby reducing the contact area between the elastic member 124 and the third curved wall 1231, reducing the friction between the elastic member 124 and the third curved wall 1231, and making it easier for the elastic member 124 to move relative to the fixing bracket 123.

The connecting member 125 is mainly configured to connect the elastic member 124 and the connecting structure 1223, and can be any known connecting member. In some embodiments, the connecting member 125 is a threaded connecting member 125. As shown in FIG. 5, the connecting member 125 is a bolt, and the connecting structure 1223 is a threaded hole. One end of the connecting member 125 is connected to the elastic member 124, and the other end passes through the through hole 1232 on the fixing bracket 123 to be in threaded connection with the connecting structure 1223. When the connecting member 125 is a bolt, correspondingly, in order to facilitate the assembly of the mirror 121 adjusting device, the mirror 121 adjusting device can further include a base 126 connected to the fixing bracket 123, and the base 126 is configured to connect the mirror 121 adjusting device to an external component. As shown in FIG. 5, the base 126 can be a plate-shaped member, and a plane on Which the base 126 is arranged is perpendicular to the axis of the through hole 1232 on the fixing bracket 123. The fixing bracket 123 can be mounted on the base 126 or integrally formed with the base 126. The base 126 can have a threaded hole, and the connecting member 125 is in threaded connection with the threaded hole.

When the first curved wall 1222, the second curved wall 1233, and the third curved wall 1231 are all part of a spherical surface, no matter how the adjusting part moves relative to the fixing bracket 123, the fixing bracket 123, the elastic assembly and the adjusting part are fixed relatively stably. When the first curved wall 1 the second curved wall 1233, and the third curved wall 1231 are not part of the spherical surface, even if the adjusting part is fixed in the groove of the fixing bracket 123, the adjusting part still has a trend of moving relative to the fixing bracket 123. Therefore, in order to stabilize the positioning of the adjusting part, the fixing bracket 123 and the elastic assembly, the mirror 121 adjusting device can further include a fixing glue. The fixing glue is connected to the fixing bracket 123 and the elastic member 124 to fix the elastic member 124 and the fixing bracket 123. That is, after adjusting the relative position of the adjusting part relative to the fixing bracket 123, the elastic member 124 and the fixing bracket 123 can be fixed by the fixing glue, so that the mirror 121 adjusting device does not cause the adjusting part and the fixing bracket 123 to spontaneously move during use.

As shown in FIGS. 1-6, a second aspect of this application also provides a reflecting assembly 120 for a LiDAR. The reflecting assembly 120 includes a mirror 121 adjusting device and a mirror 121 according to any of the above-mentioned embodiments. The mirror 121 is mounted on a mirror mounting structure 1221 of the mirror 121 adjusting device, and the reflecting surface of the mirror 121 faces away from the mirror mounting structure 1221.

A third aspect of this application also provides a LiDAR 100, which includes a reflecting assembly 120 according to any of the foregoing embodiments. A mirror 121 in the reflecting assembly 120 is configured to reflect laser. In addition, during a mounting or debugging process, the optical path of the reflected laser can be adjusted by changing the arrangement angle of the mirror 121.

Figure 7:
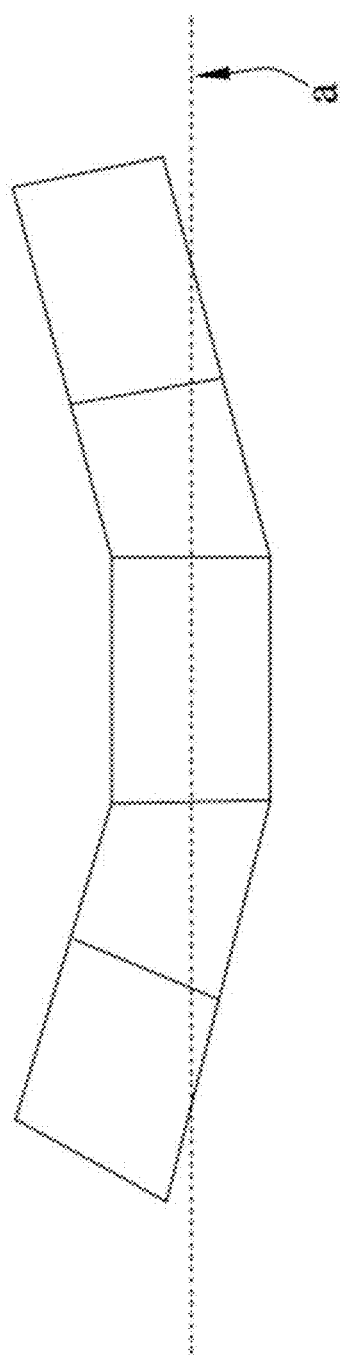
FIG. 7 shows a schematic diagram of a laser detection field of view of a LiDAR in the prior art, wherein an a-axis shows a horizontal 0-degree field of view line.
Figure 8:
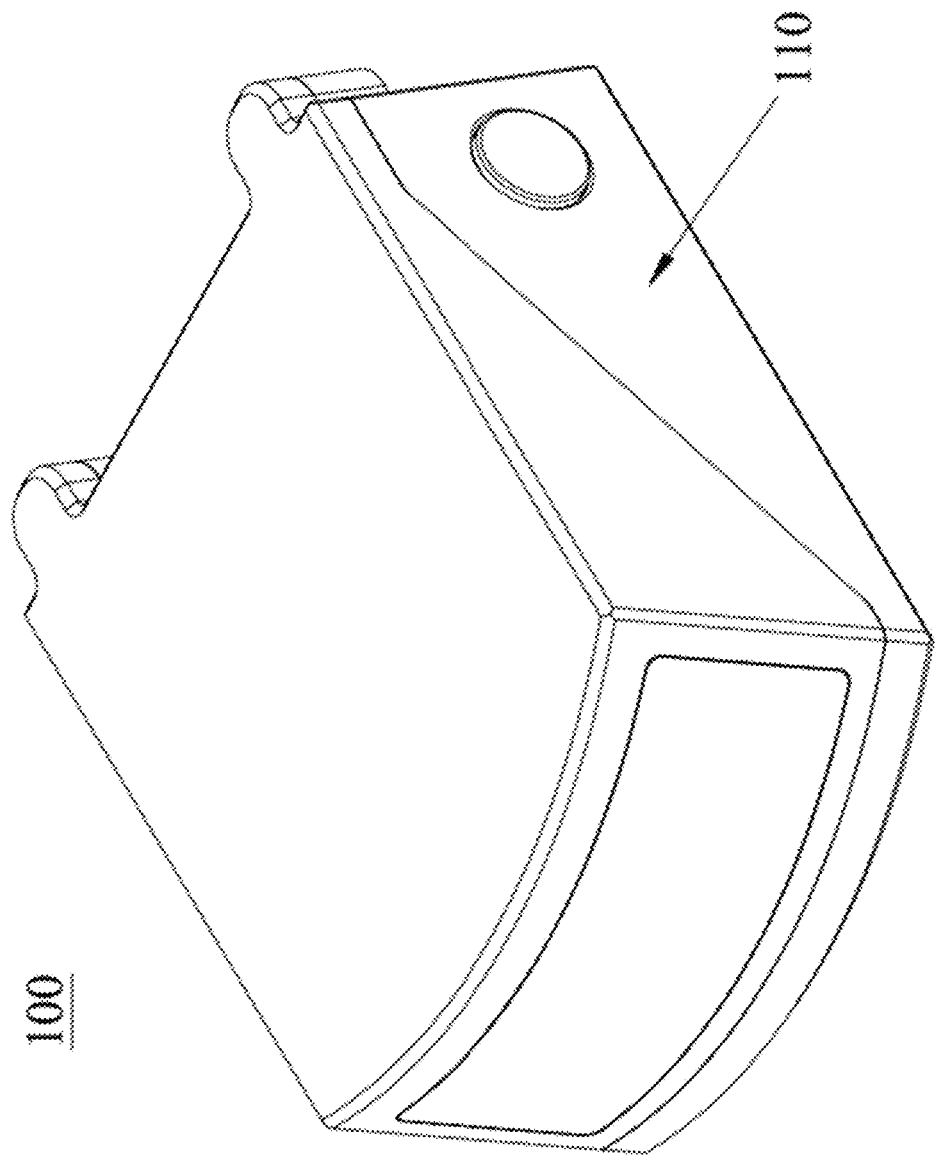
FIG. 8 shows a perspective diagram of a LiDAR according to an embodiment of this application.

In the prior art, when a LiDAR has a plurality of reflecting devices, the distance and the deflection angle of a galvanometer device relative to each reflecting device affect a detection field of view corresponding to each reflecting device. The reflecting device at the edge is farther relative to the galvanometer device. The relative deflection angle is larger, so the detection field of view generated moves upwards and deviates from a horizontal 0-degree detection field of view. FIG. 7 shows five detection fields of view. An edge detection field of view at both sides deviates from an alignment line a of the horizontal 0-degree detection field of view upwards. It can be understood that the horizontal 0-degree detection field of view is a target detection region. When the edge detection field of view deviates from a horizontal detection field of view, an edge transceiving device cannot detect an object at a target region, which affects the overall detection efficiency of the LiDAR for the target region.

As shown in FIGS. 8-18, this application also provides a LiDAR 100. The LiDAR 100 has a plurality of laser transceiving devices 141. Under the premise that the reflected laser field of view formed by each laser transceiving device 141 meets the requirements, the LiDAR 100 can make the volume of the LiDAR 100 smaller. In some embodiments, the LiDAR 100 includes a housing, a laser transceiving module 140, a reflecting assembly 120, and a galvanometer module 130. It should be noted that, for the convenience of description, it is defined that the LiDAR 100 has an intermediate optical path axis 150 arranged in the middle of the detection region, and the intermediate optical path axis 150 can serve as the axis 150 of the LiDAR 100 pointing in a straight forward direction.

The housing includes a base 110, and the base 110 can be a regular plate-shaped member or an irregular structure. The base 110 can be arranged inside the LiDAR 100 to provide a carrier for other components of the LiDAR 100. The base 110 can also be a part of a housing of the LiDAR 100. The base 110 includes a bearing surface 111 facing the inside of the LiDAR 100, and the galvanometer module 130 of the LiDAR 100 is fixed on the bearing surface 111. The bearing surface 111 can be a flat surface or an irregular curved surface, and the specific shape of the bearing surface 111 depends on specific assembly requirements.

The bearing surface 111 of the base 110 is provided with an adjusting structure 160 for adjusting the distance between the reflecting assembly 120 and the bearing surface 111. The adjusting structure 160 can be an independent component and connected to the hearing surface 111. For example, the adjusting structure 160 can be connected to the bearing surface 111. The bearing surface 111 is bonded or threaded. The adjusting structure 160 can also be integrally provided with the base 110, that is, the adjusting structure 160 is a convex or concave structure on the bearing surface 111 of the base 110.

Figure 9:
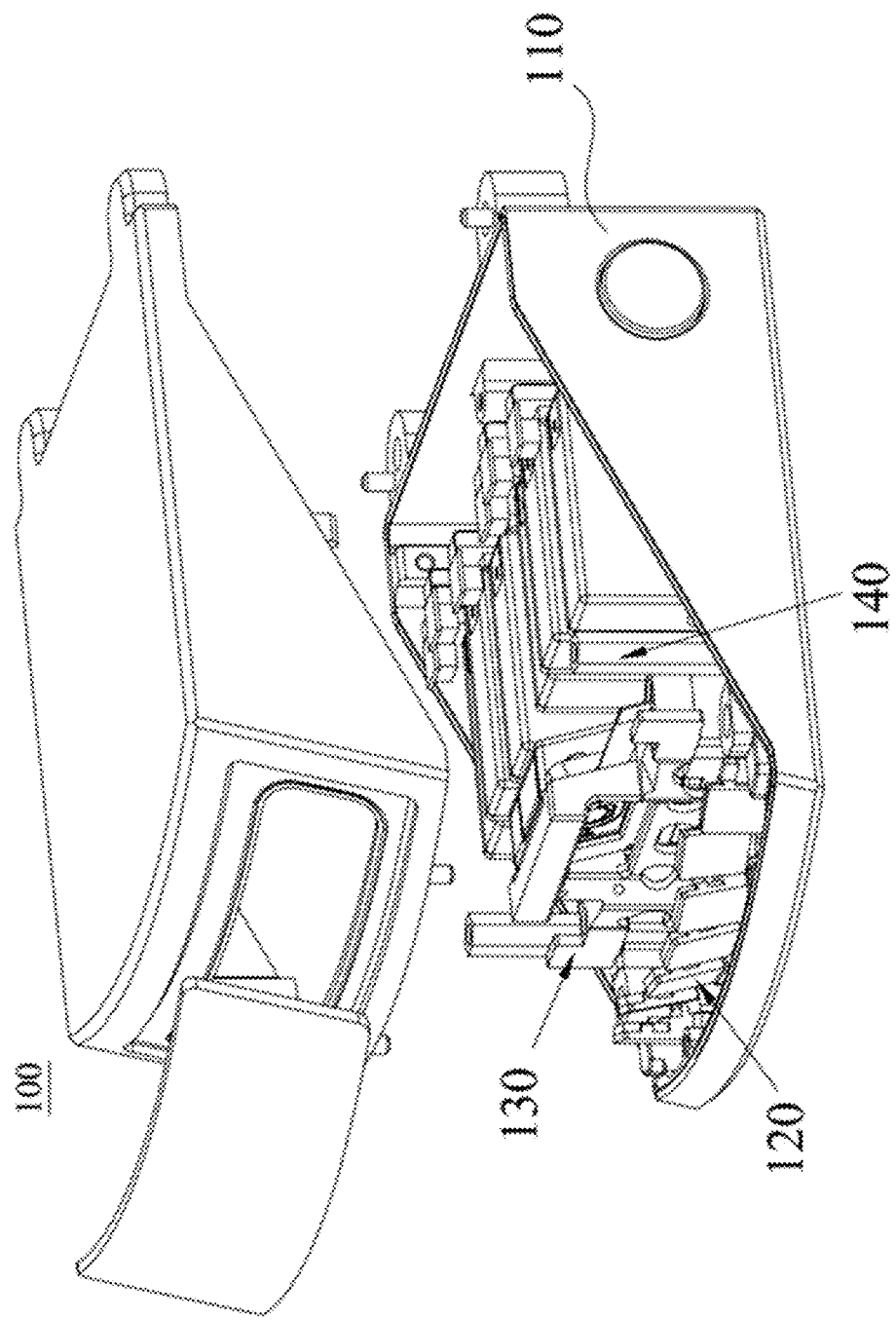
FIG. 9 shows an exploded schematic diagram of a LiDAR according to an embodiment of the application.
Figure 10:
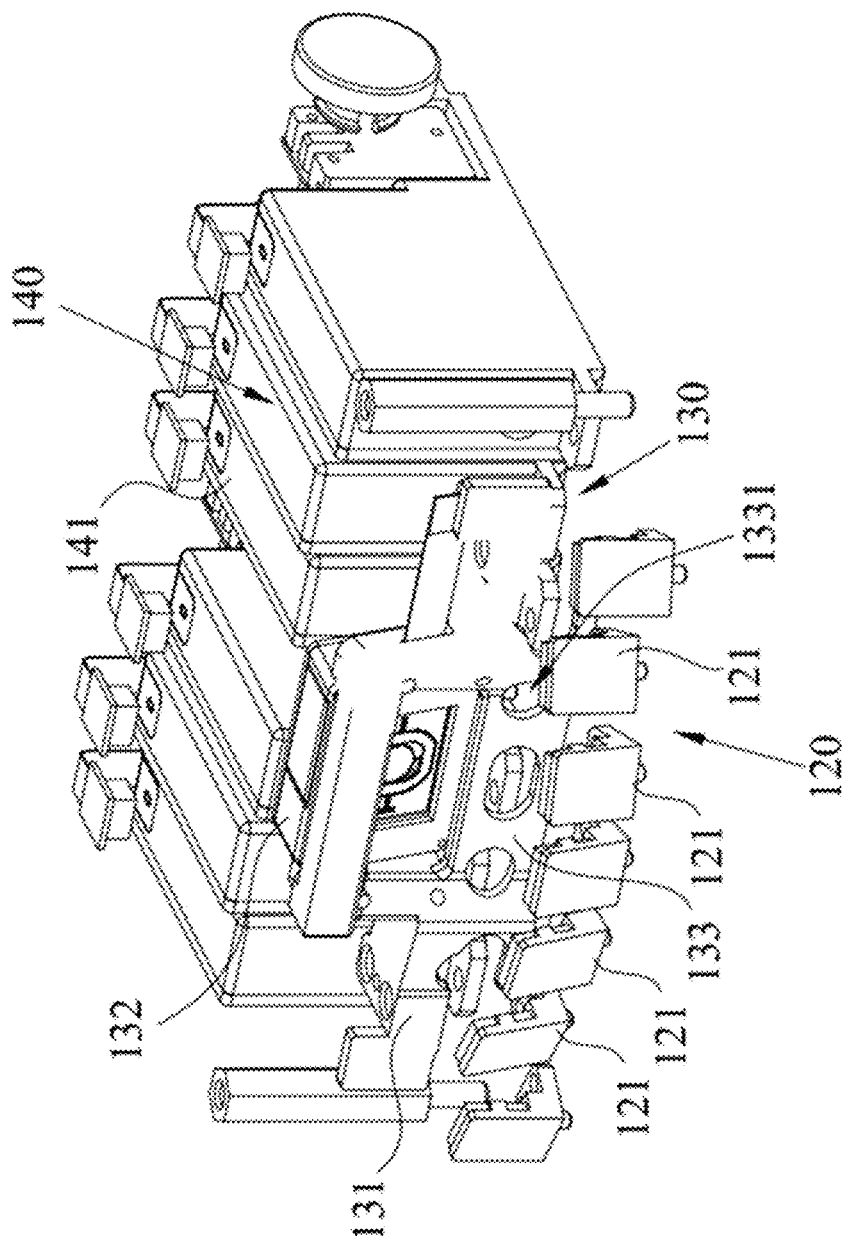
FIG. 10 shows a perspective schematic diagram of a combination of a reflecting assembly, a galvanometer module, and a laser transceiving module according to an embodiment of this application.
Figure 11:
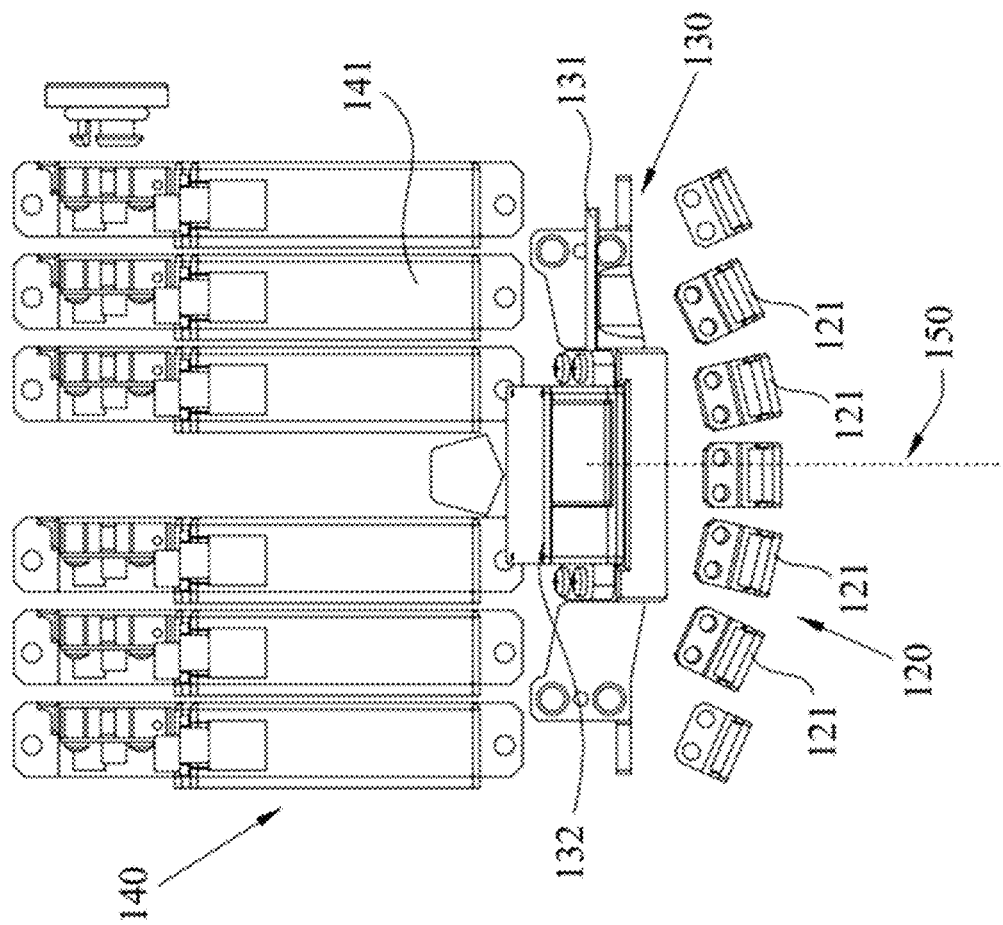
FIG. 11 shows a schematic top view of a combination of a reflecting assembly, a galvanometer module, and a laser transceiving module according to an embodiment of this application.

The reflecting assembly 120 includes a plurality of mirrors 121, and each mirror 121 is configured to reflect the light emitted from the LiDAR 100 to the galvanometer module 130, respectively. As shown in FIGS. 9-11, the reflecting assembly 120 in FIG. 11 has seven components for reflecting, but the three reflecting assemblies located in the middle and on both sides of this application are configured to detect and scan the ROI area. The mirror that belongs to the ROI area is therefore not used as the mirror 121 in this embodiment.

Figure 12:
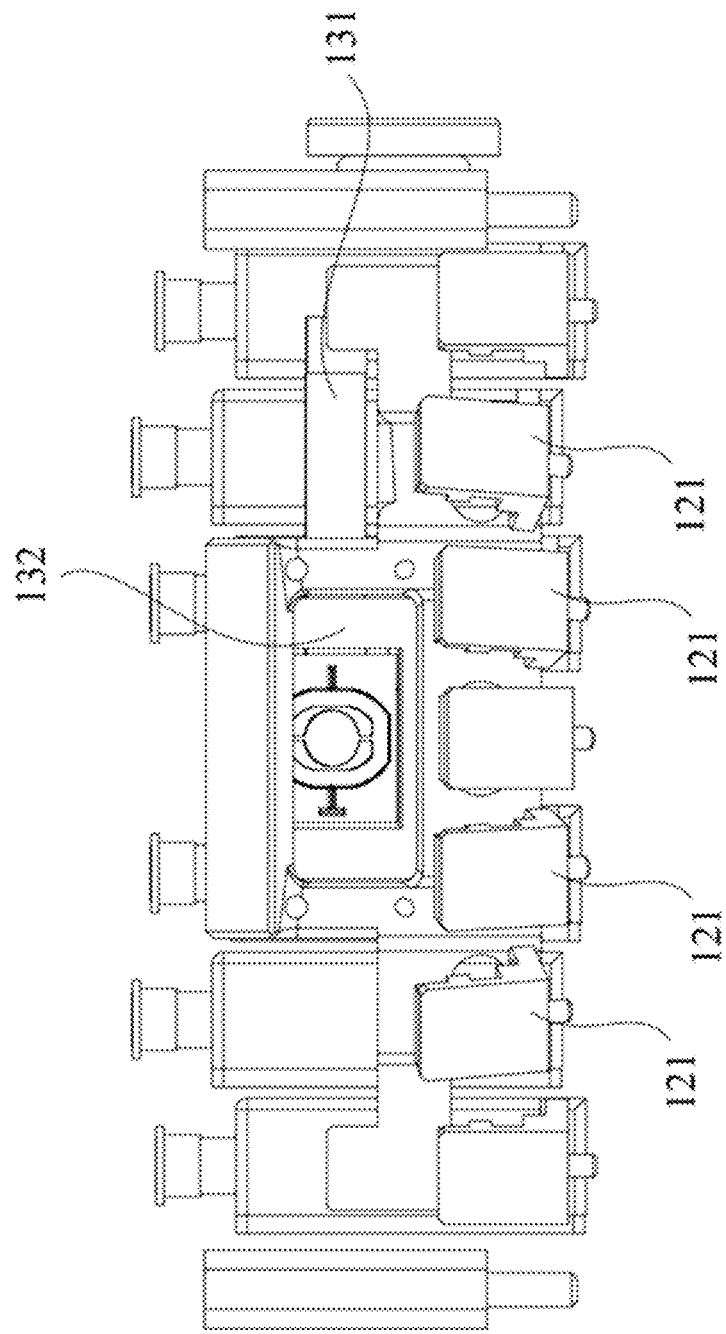
FIG. 12 shows a schematic front view of a combination of a reflecting assembly, a galvanometer module, and a laser transceiving module according to an embodiment of this application.
Figure 13:
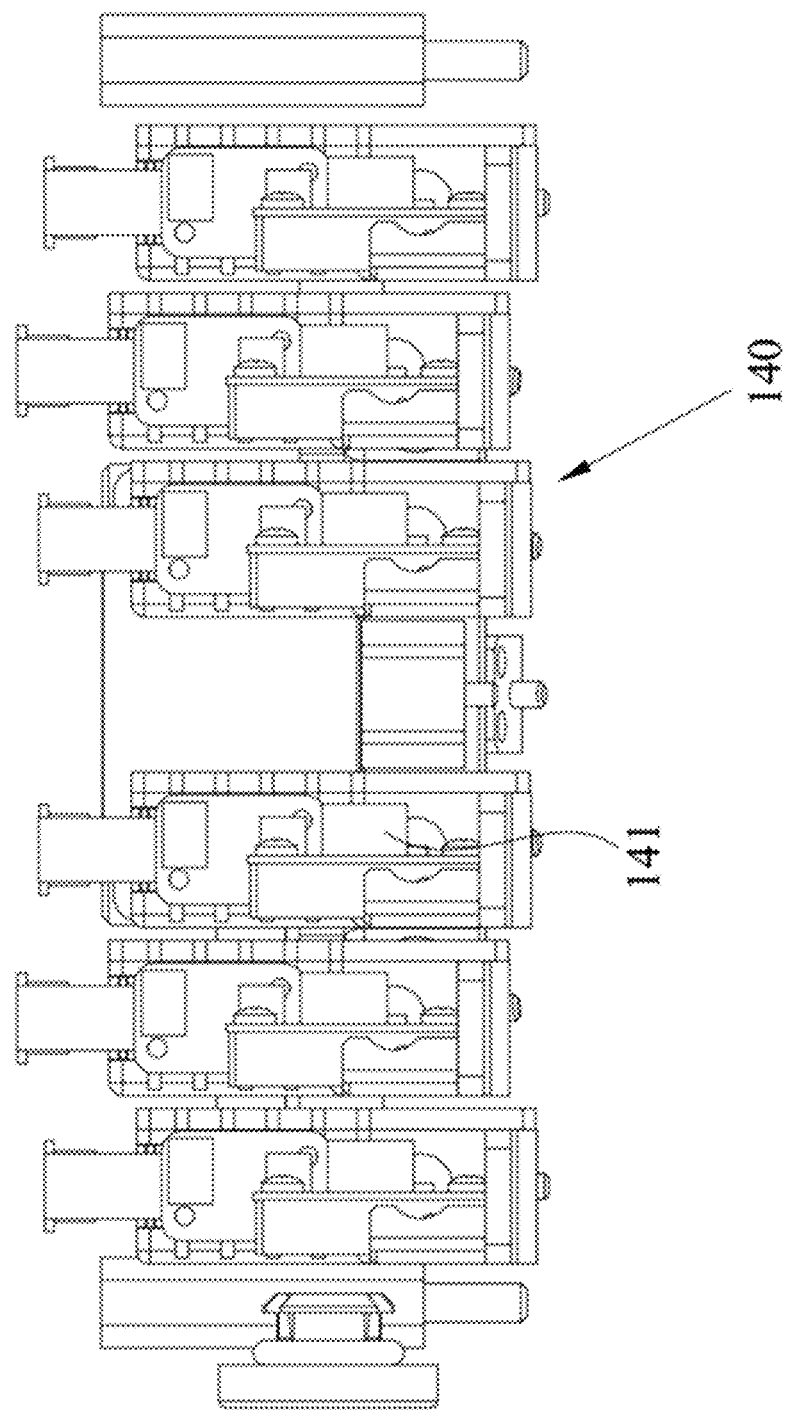
FIG. 13 shows a schematic rear view of a combination of a reflecting assembly, a galvanometer module, and a laser transceiving module according to an embodiment of this application.
Figure 14:
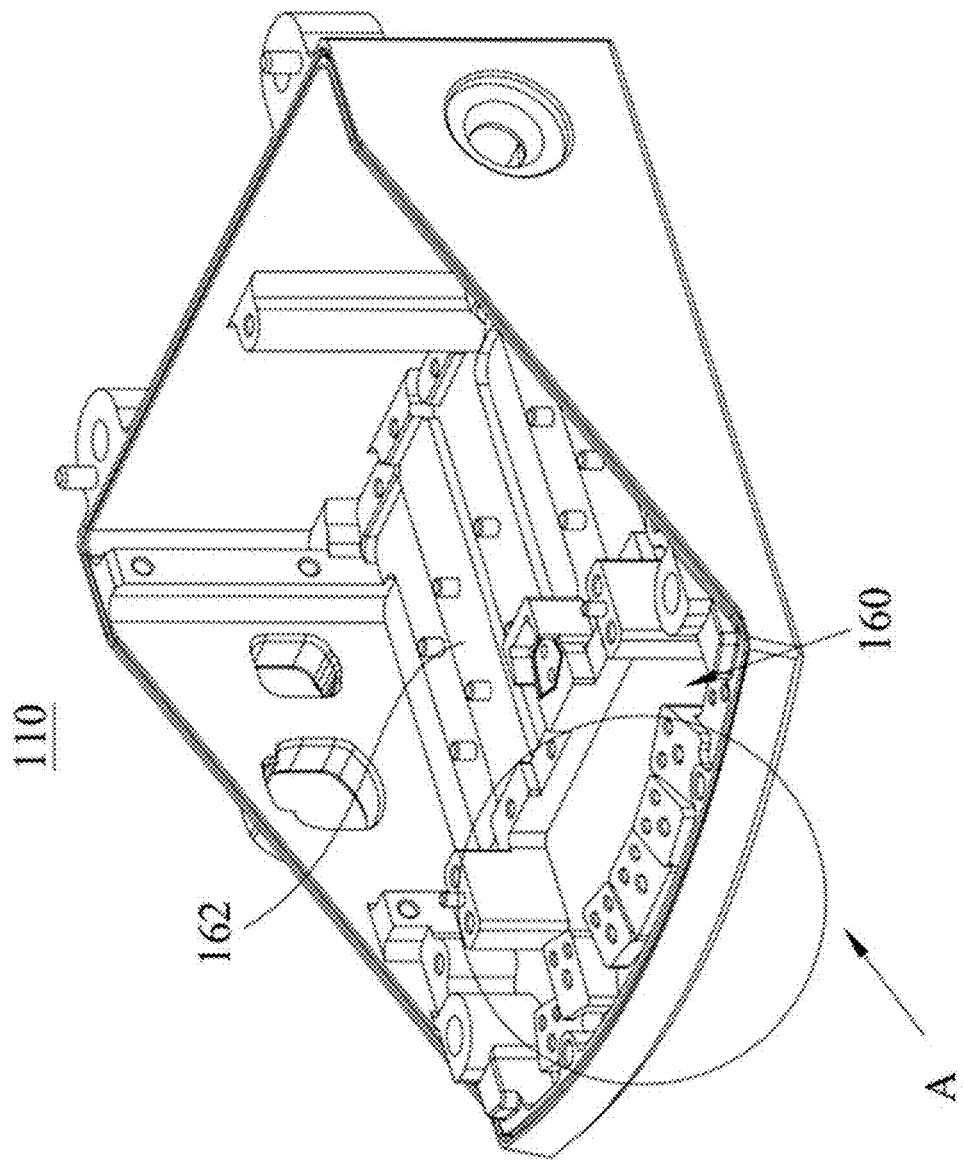
FIG. 14 shows a first perspective diagram of a base according to an embodiment of this application.
Figure 15:
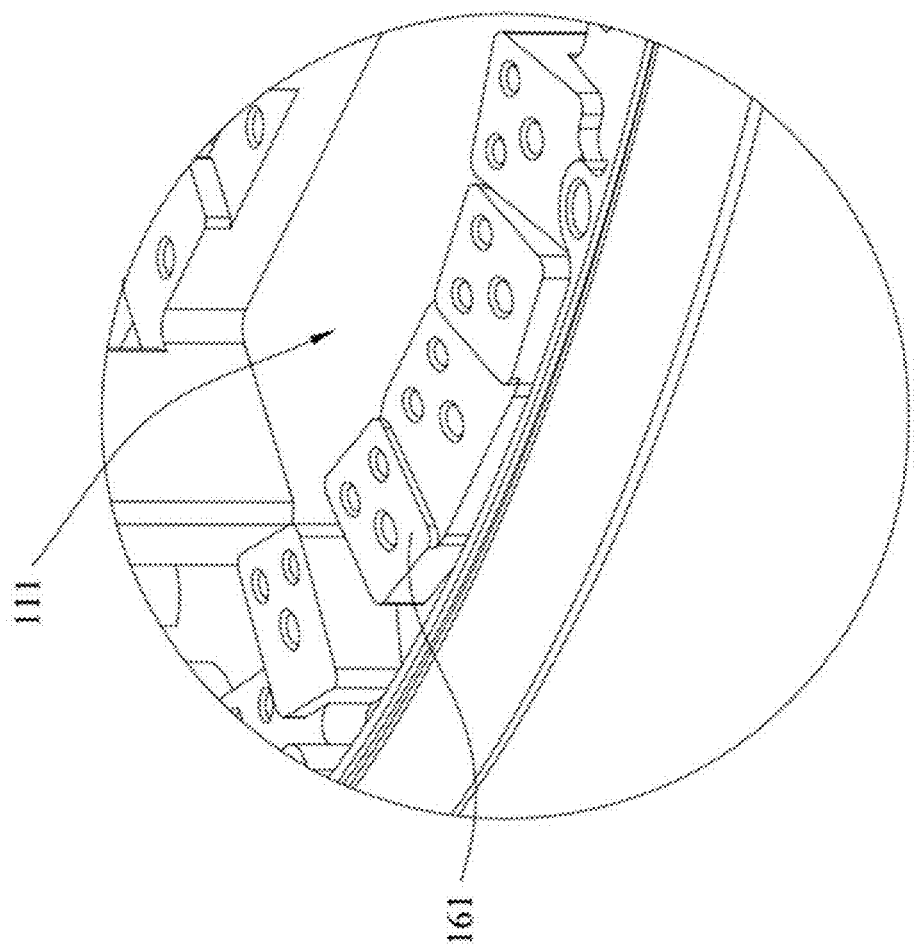
FIG. 15 shows a partially enlarged schematic diagram of A of FIG. 14.

In some embodiments, four mirrors 121 (in other embodiments, the number of mirrors is not limited, and can be two or more) are provided. Each mirror 121 independently receives emergent laser inside the LiDAR 100, and reflects the emergent laser to the galvanometer module 130. Particularly, each mirror 121 is fixed to the adjusting structure 160, respectively. The adjusting structure 160 is configured so that each mirror 121 mounted thereon has a corresponding distance from the bearing surface 111 (for example, as shown in FIG. 12, the mirrors 121 that are arranged on both sides of a middle optical path axis 150 and to which the distance from the middle optical path axis 150 is the same have the same height), so that the emergent laser reflected by each mirror 121 forms a preset laser detection field of view (which can be an optimal laser detection field of view) outside the LiDAR 100. In other embodiments, after the mirror 121 is mounted in the adjusting structure 160, the distance of each mirror 121 relative to the bearing surface 111 can also be different, so that the laser detection field of view formed outward by the emergent laser reflected by each mirror 121 at the LiDAR 100 is in the best state.

It should be noted that in some embodiments, when the adjusting structure 160 all protrude from the bearing surface 111, the distance from the mirror 121 to the bearing surface 111 is determined by reference to the part of the mirror 121 closest to the bearing surface 111 instead of the center of the mirror 121. Since the adjusting structure 160 can raise the mirror 121 corresponding to the emitting laser that deviates from the middle optical path axis 150 by a certain distance relative to the bearing surface 111. This structure can offset the influence on a laser detection region caused by its deviation from the middle optical path axis 150. After the mirror 121 is raised, a space occupied by the mirror 121 is an original surplus space, so this structure does not occupy additional volume, so that the overall volume of the LiDAR 100 remains unchanged. Therefore, compared with the LiDAR in the prior art, the volume of the LiDAR 100 in this disclosure can be smaller.

When the adjusting structure 160 and the base 110 are integrally arranged, the adjusting structure 160 can be a boss on the bearing surface 111 or can be a groove on the bearing surface 111, or part of the adjusting structure is the boss on the bearing surface 111 and part of the adjusting structure is the groove on the bearing surface 111. In the above three cases, the arrangement height from the mirror 121 to the base 110 can be adjusted. When the adjusting structures 160 are all the bosses on the bearing surface 111, the adjusting structure 160 can include a plurality of second bosses 161 arranged on the bearing surface 111, and each mirror 121 is connected to each second boss 161 in a one-to-one correspondence. The size of each second boss 161 in a direction perpendicular to the bearing surface 111 is equal to a distance from the mirror 121 connected to the hearing surface 111 to the bearing surface 111. That is, the arrangement height from each mirror 121 to the base 110 is determined by the size of each second boss 161 in the direction perpendicular to the bearing surface 111. When the size of the second boss 161 in the direction perpendicular to the hearing surface 111 is larger, the distance of the corresponding mirror 121 relative to the bearing surface 111 is larger. When the size of the second boss 161 in the direction perpendicular to the bearing surface 111 is smaller, the distance from the corresponding mirror 121 to the bearing surface 111 is smaller.

Figure 16:
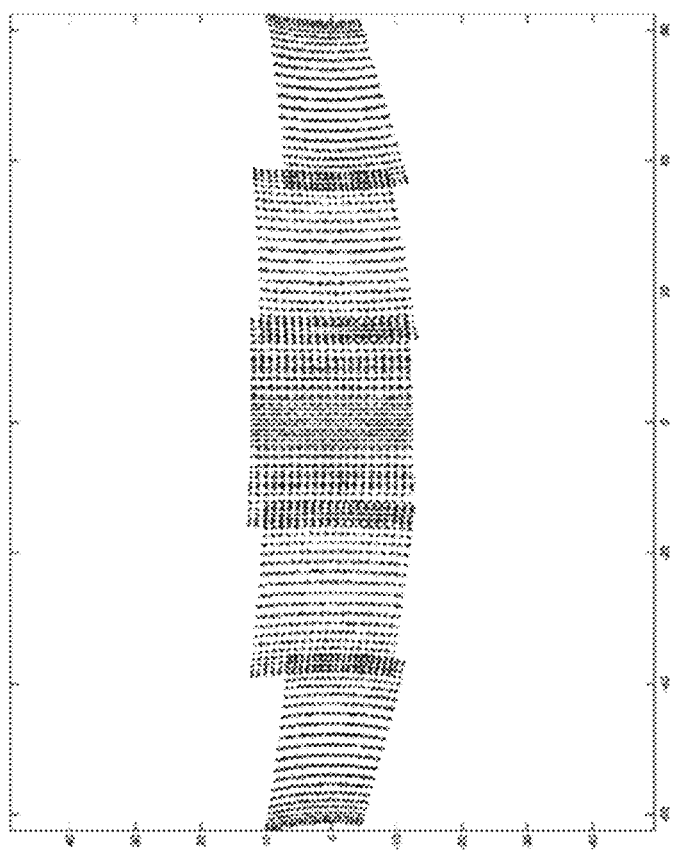
FIG. 16 shows a schematic diagram of a laser detection field of view of a LiDAR according to this application, where an abscissa is a horizontal angle of field of view, and an ordinate is a vertical angle of field of view.

In order to facilitate the positional arrangement of the plurality of mirrors 121, each mirror 121 can be arranged around the galvanometer module 130. In some embodiments, the projection of the center of each mirror 121 on the bearing surface 111 can be arranged in a common arc. When the mirror 121 is arranged in the above structure, to obtain an optimal detection field of view, the adjusting structure 160 can be configured to make a distance from the mirror 121 that deviates from the middle optical path axis 150 to the bearing surface 111 greater. That is, the size of the second boss 161 perpendicular to the bearing surface 111 that deviates from the middle optical path axis 150 is larger. In this way, the height of the field of view corresponding to the mirror 121 located far away from the middle optical path axis 150 deviating from a center 0-degree field of view alignment line can be reduced. A specific detection field of view effect is shown in FIG. 16, thereby improving the detection efficiency of a detection module at the edge. In turn, the overall detection efficiency of the LiDAR is improved.

The LiDAR 100 includes the laser transceiving module 140, and the laser transceiving module 140 is arranged in the housing of the LiDAR 100. As shown in FIG. 11, in some embodiments, the reflecting assembly 120 is arranged on the side of the galvanometer module 130, and the laser transceiving module 140 is arranged on the side of the galvanometer module 130 away from the reflecting assembly 120. The laser transceiving module 140 includes a plurality of laser transceiving devices 141, and an emergent laser generated by each laser transceiving device 141 emits to each mirror 121 in a one-to-one correspondence. The number of laser transceiving devices 141 can be the same as the number of mirrors 121, and the laser transceiving devices 141 and the mirrors 121 have a one-to-one correspondence. In other embodiments, the number of laser transceiving devices 141 can be more than the number of mirrors 121, and the emergent laser generated by the plurality of laser transceiving devices 141 emits to the same mirror 121 at the same time. The laser transceiving module 140 and the reflecting assembly 120 are arranged on both sides of the galvanometer module 130, respectively, thereby improving the integration degree of the LiDAR 100, and reducing the overall occupied space of the LiDAR 100.

The laser transceiving device 141 can be fixed to the base 110 and other positions in the housing. To achieve better integration, each laser transceiving device 141 can be fixed to the base 110. When the laser transceiving device 141 is fixed to the base 110, each laser transceiving device 141 is arranged at the adjusting structure 160. The adjusting structure 160 is configured so that each laser transceiving device 141 mounted thereon has a corresponding distance from the bearing surface 111. Therefore, the emergent laser generated by each laser transceiving device 141 emits to the corresponding mirror 121 along a preset path. The above structure enables each laser transceiving device 141 to correspond to the position of each mirror 121.

Likewise, the parts of the adjusting structure 160 that is connected to the laser transceiving device can all be bosses on the bearing surface 111 or can all be grooves on the bearing surface 111, or can partially be bosses on the bearing surface 111 and partially be grooves on the bearing surface 111. In the foregoing three cases, the arrangement height from the laser transceiving device 141 to the base 110 can be adjusted. When the part of the adjusting structure 160 that is connected to the laser transceiving device 141 is the boss on the bearing surface 111, the adjusting structure 160 further includes a plurality of first bosses 162 arranged on the bearing surface 111. Each laser transceiving device 141 is connected to each first boss 162 in a one-to-one correspondence. The size of each first boss 162 in the direction perpendicular to the bearing surface 111 is equal to a distance from the laser transceiving device 141 connected thereto to the bearing surface 111. That is, the arrangement height from each laser transceiving device 141 to the base 110 is determined by the size of each first boss 162 in the direction perpendicular to the bearing surface 111. When the size of the first boss 162 in the direction perpendicular to the bearing surface 111 is larger, a distance from the corresponding laser transceiving device 141 to the bearing surface 111 is larger. When the size of the first boss 162 in the direction perpendicular to the bearing surface 111 is larger, a distance from the corresponding laser transceiving device 141 to the bearing surface 111 is smaller.

In some embodiments, when a certain laser transceiving device 141 emits laser to a certain mirror 121, it can be considered that the laser transceiving device 141 corresponds to the mirror 121. The first boss 162 to which the laser transceiving device 141 is connected corresponds to the second boss 161 connected to this mirror 121. In some embodiments, the size of the first boss 162 and the second boss 161 corresponding to each other perpendicular to the bearing surface 111 can be the same, so that the raised height of the laser transceiving device 141 and the mirror 121 corresponding to each other are the same.

In some embodiments, the base 110 can be an outer shell of the LiDAR 100, wherein the bearing surface 111 of the base 110 is a wall surface of the base facing the inside of the LiDAR 100. At this time, the base 110 further includes an outer wall surface 112 opposite to the bearing surface 111, and the outer wall surface 112 is arranged outside the LiDAR 100.

When the adjusting structure 160 and the base 110 are integrally arranged, since the adjusting structure 160 is a protrusion on the bearing surface 111, the adjusting structure 160 increases the material of the base 110 on the one hand, and also increases the weight of the base 110 on the other hand. To reduce the material of the base 110 and the weight of the base 110, in some embodiments, a plurality of first heat dissipation grooves (not shown in the figure) can be arranged on the outer wall surface 112 of the base 110. Each first heat dissipation groove is arranged in the orthographic projection region of each first boss 161 on the outer wall surface 112. The first heat dissipation groove can also increase the outer surface area of the LiDAR 100, so the heat dissipation performance of the LiDAR 100 can also be improved. The size and depth of the first heat dissipation groove depend on specific requirements. Each first boss 161 and each second boss 162 can be correspondingly provided with one first heat dissipation groove or a plurality of first heat dissipation grooves. When the material strength of the base 110 is sufficient, the depth of the first heat dissipation groove can be greater than the minimum wall thickness of the base 110. Similarly, a plurality of second heat dissipation grooves 113 can also be provided on the outer wall surface 112. Each second heat dissipation groove 113 is arranged in the orthographic projection region of each second boss 162 on the outer wall surface 112 in a one-to-one correspondence. The first heat dissipation groove can dissipate heat for the reflecting assembly 120. The second heat dissipation groove 113 can dissipate heat for the laser transceiving module 140.

Figure 17:
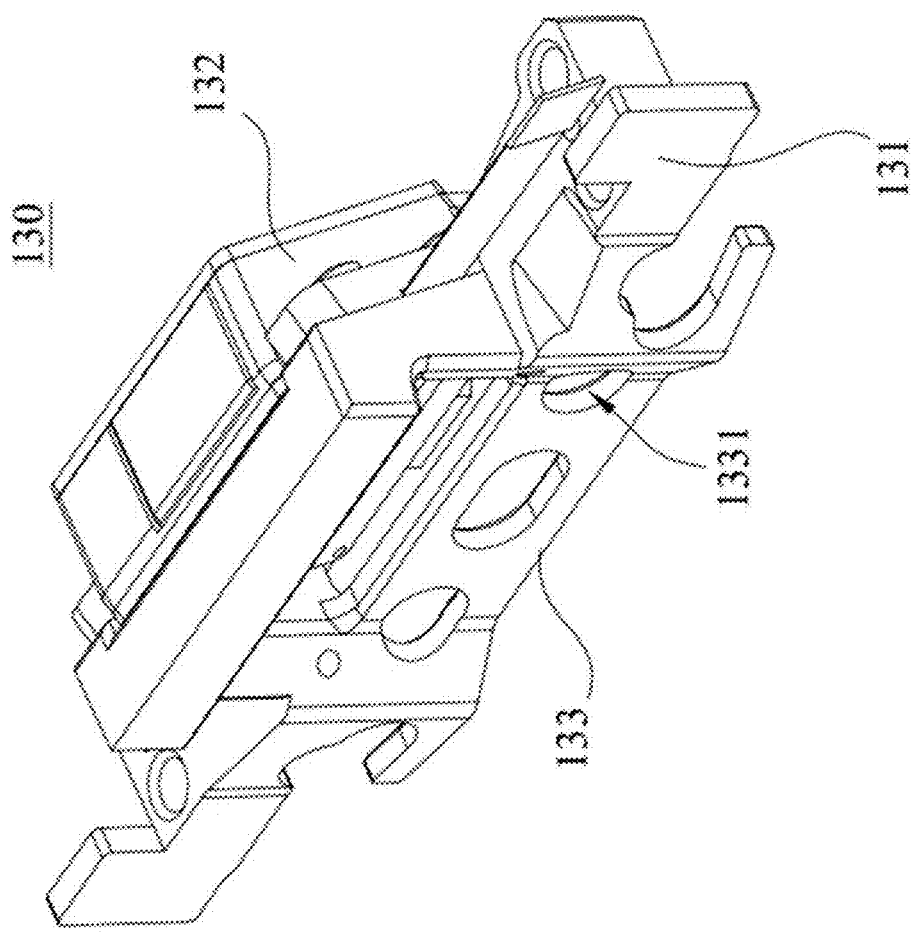
FIG. 17 shows a perspective diagram of a galvanometer module according to an embodiment of this application.
Figure 18:
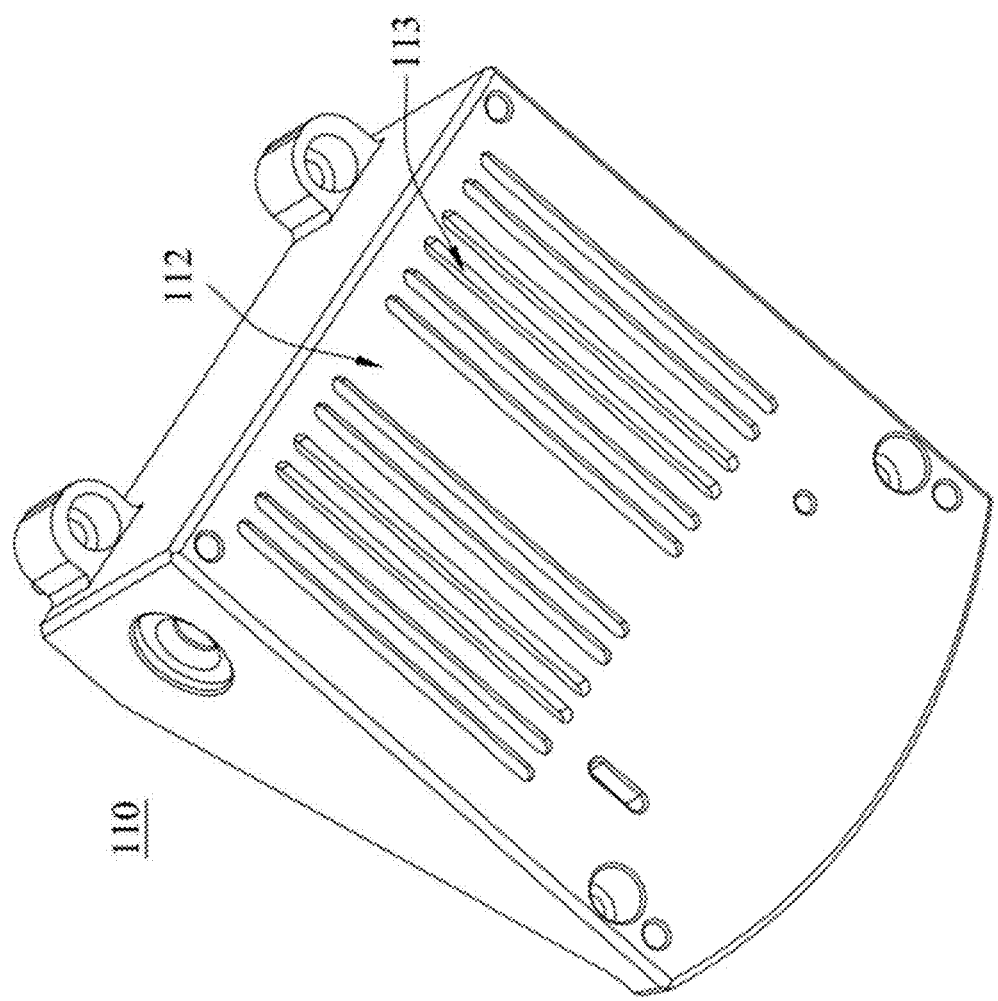
FIG. 18 shows a second perspective diagram of a base according to an embodiment of this application.

When the laser transceiving module 140 and the reflecting assembly 120 are arranged on both sides of the galvanometer module 130, respectively, to make the emergent laser generated by the laser transceiving module 140 emit to the reflecting assembly 120, the height from the galvanometer module 130 to the laser transceiving module 140 and the reflecting assembly 120 can be adjusted. In some embodiments, as shown in FIG. 17, the galvanometer module 130 can include a bracket 131 and a galvanometer device 132. The bracket 131 is connected to the bearing surface 111. The galvanometer device 132 is arranged on the bracket 131. The bracket 131 can include a relief channel. The emergent laser generated by each laser transceiving device 141 passes through the relief channel and emits to each mirror 121 in a one-to-one correspondence. The bracket 131 is configured to raise the height of the galvanometer module 130. The relief channel in the bracket 131 is configured to allow the laser transceiving module 140 to generate the emergent laser to pass through and emit to the reflecting assembly 120.

In some embodiments, the galvanometer module 130 can further include a light shielding plate 133. The light shielding plate 133 is arranged in the relief channel for shielding the laser reflected by the reflecting assembly 120 to the laser transceiving module 140. The shielding plate 133 can be a separate component and connected to the bracket 131. The light shielding plate 133 can also be integrally formed with the bracket 131. The light shielding plate 133 can prevent the stray light reflected by the reflecting assembly 120 from returning to the laser transceiving device 141, thereby affecting the detection accuracy. When the reflecting assembly 120 has a plurality of mirrors 121, the light shielding plate 133 can include a plurality of relief holes 1331. The emergent laser generated by each laser transceiving device 141 correspondingly passes through one relief hole 1331 and emits to the mirror 121. That is, the number of the relief holes 1331 corresponds to the number of the laser transceiving devices 141 one by one. When the number of the laser transceiving devices 141 is the same as the number of the mirrors 121, the number of the laser transceiving device 141, the mirrors 121, and the relief holes 1331 is the same. The size of the relief hole 1331 depends on actual demands, and is not repeated here.

In some embodiments, the reflecting assembly 120 can further include the mirror adjusting device in any of the foregoing embodiments. The mirror adjusting device is configured to mount the foregoing mirror 121 for reflecting laser. When the reflecting assembly 120 has the plurality of mirrors 121, the plurality of mirror adjusting devices can be added. Each mirror adjusting device is mounted with each mirror 121 in a one-to-one correspondence.

Figure 19:
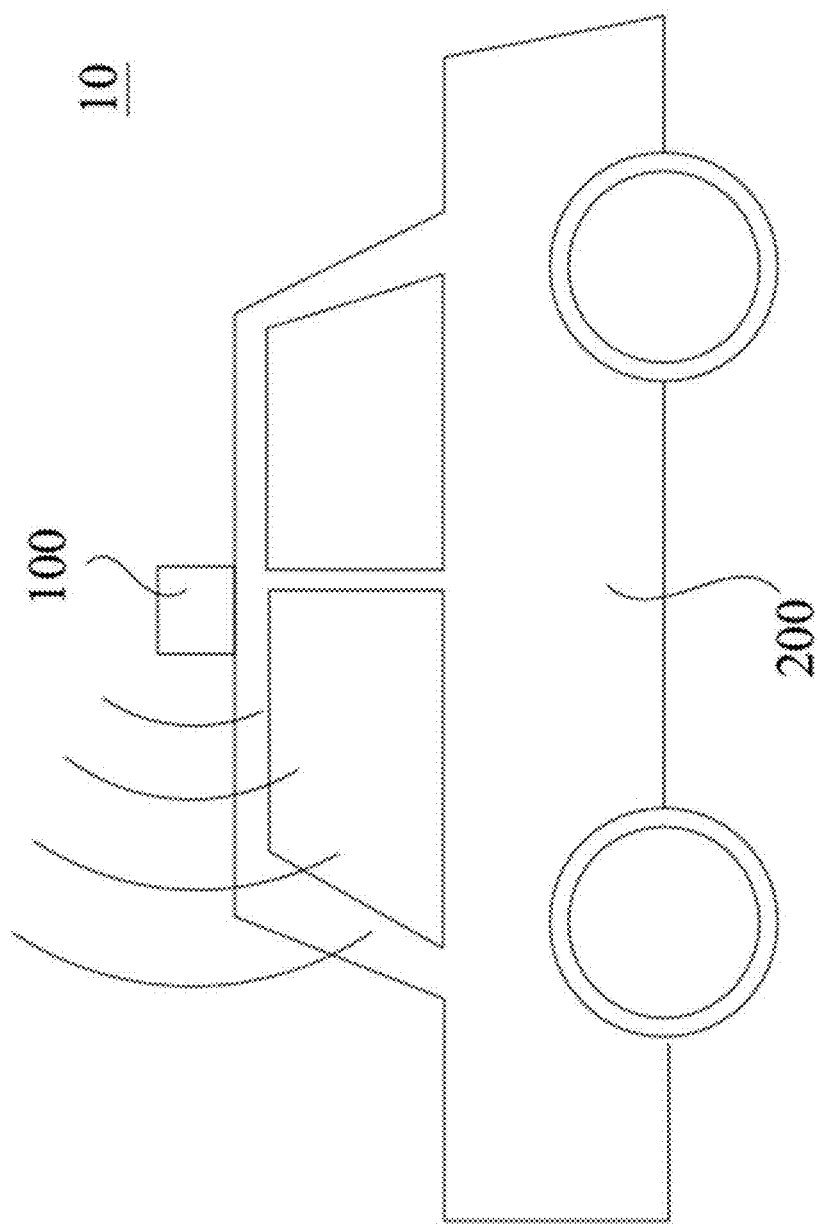
FIG. 19 shows a schematic diagram of a car according to an embodiment of this application.
Figure 20:
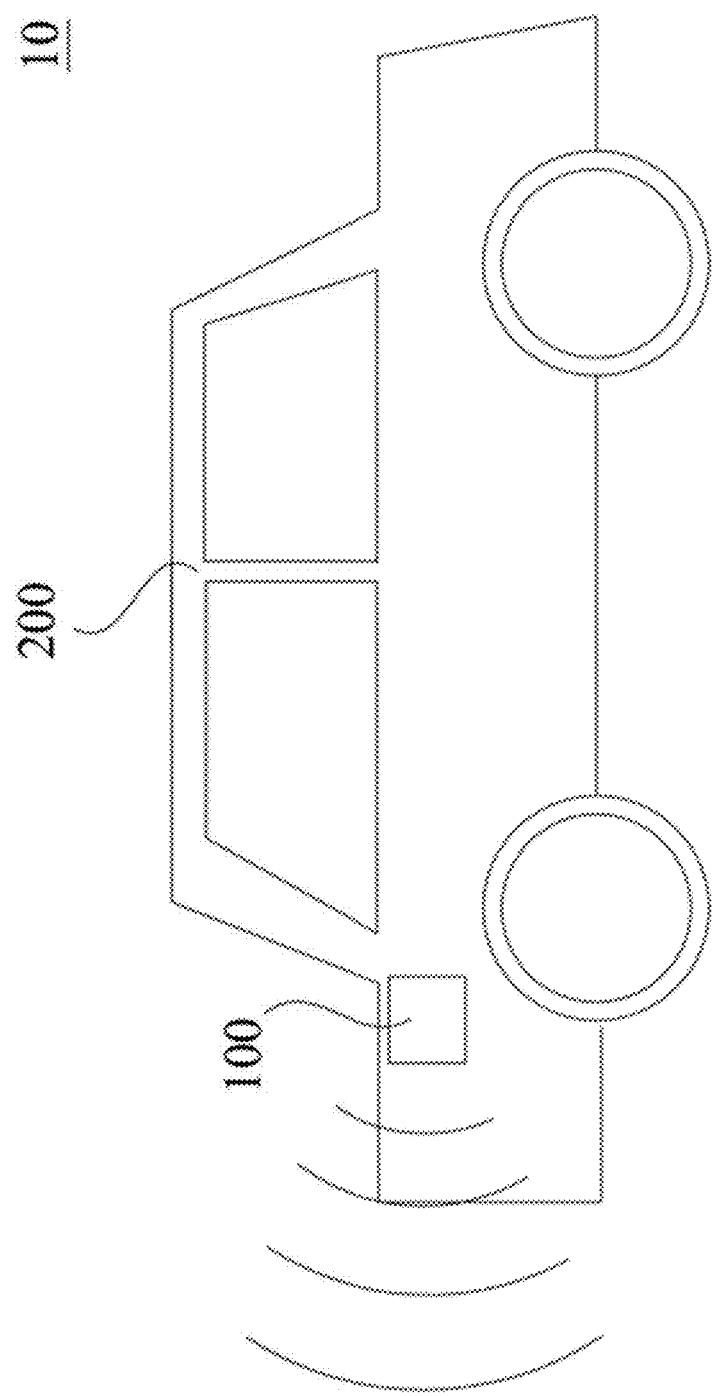
FIG. 20 shows a schematic diagram of a car according to another embodiment of this application.
Figure 21:
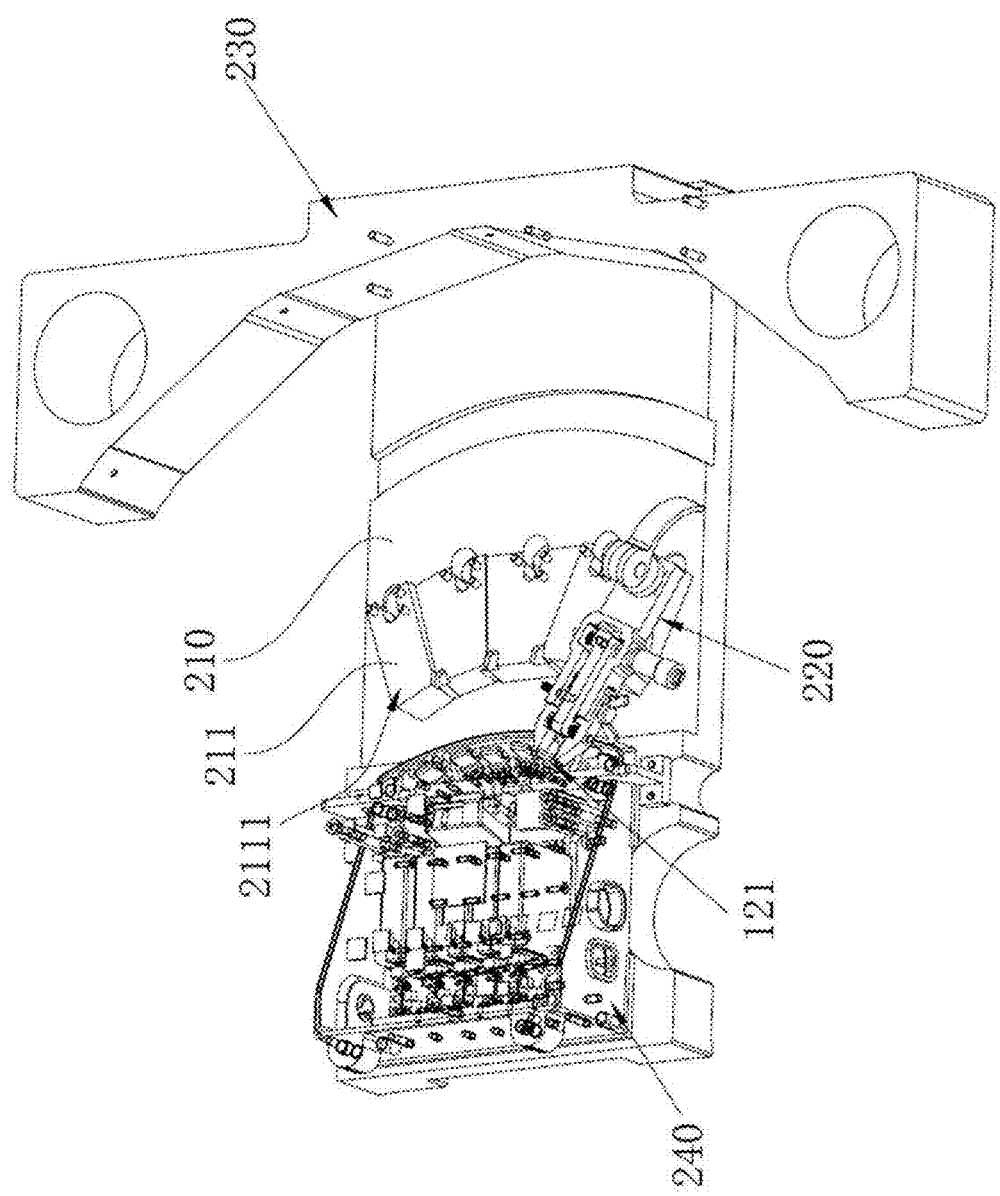
FIG. 21 shows a perspective diagram of the combination of tooling according to an embodiment of this application and some parts of a LiDAR.
Figure 22:
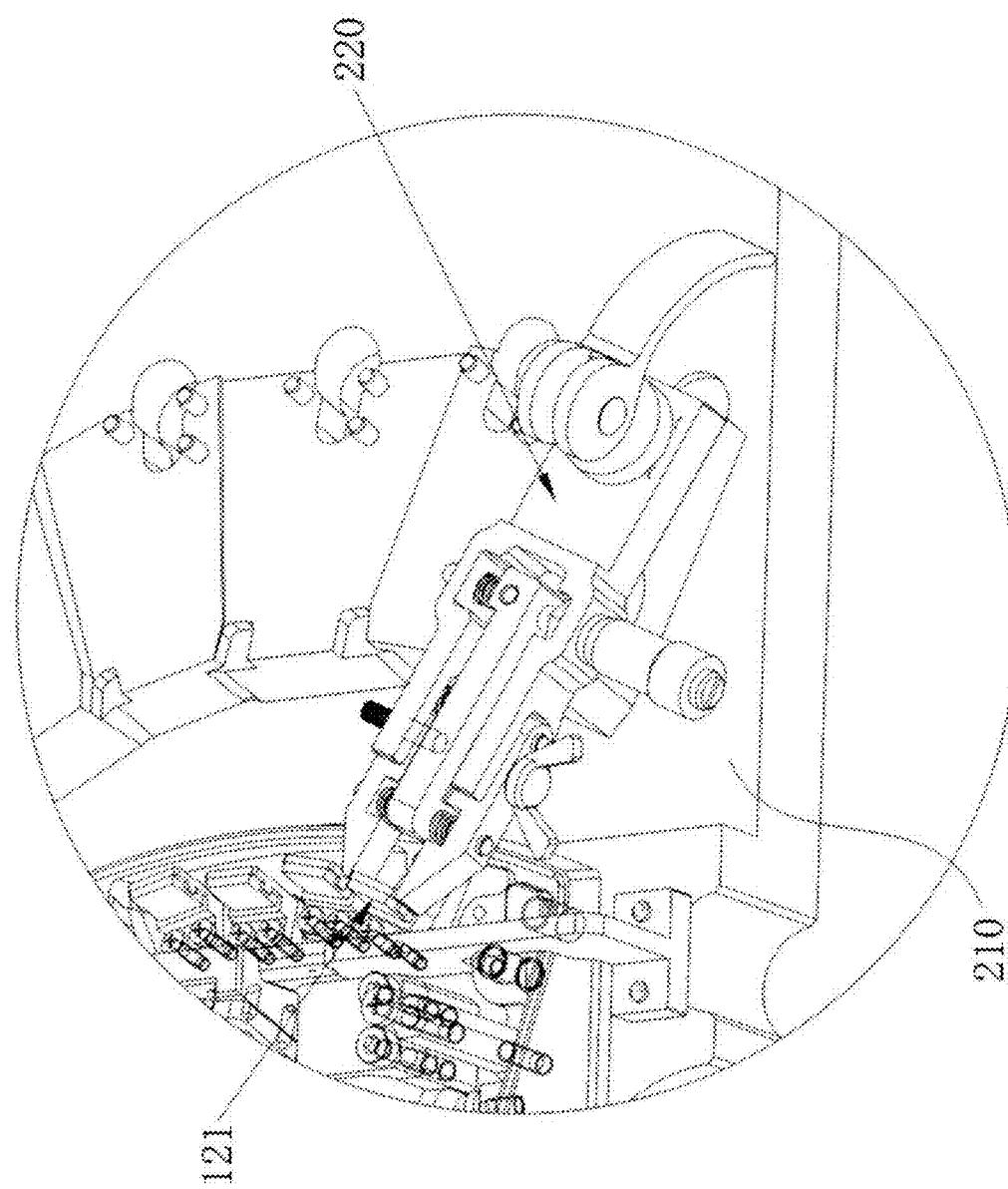
FIG. 22 is a partially enlarged schematic diagram of FIG. 21.
Figure 23:
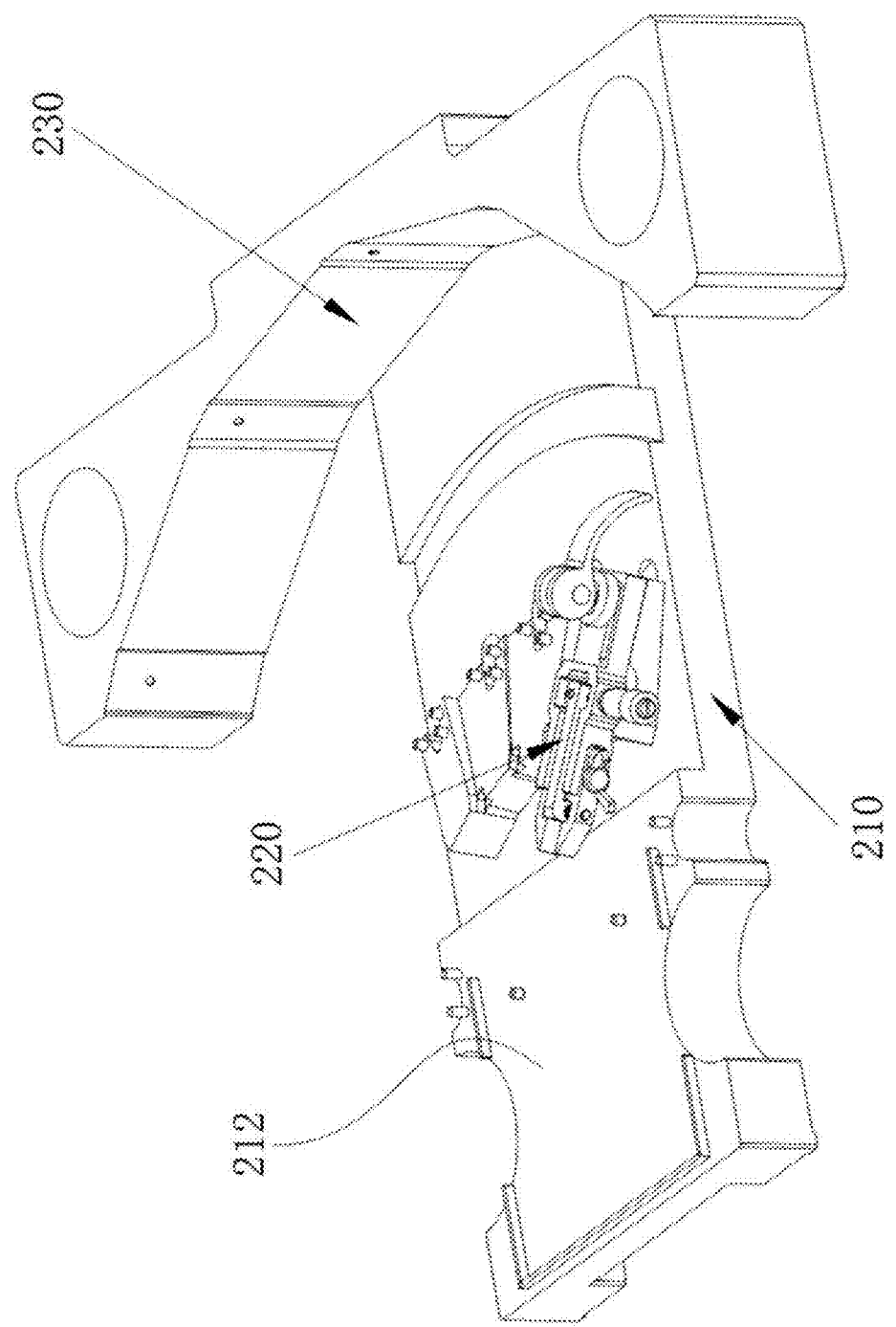
FIG. 23 shows a perspective diagram of tooling according to an embodiment of this application.
Figure 24:
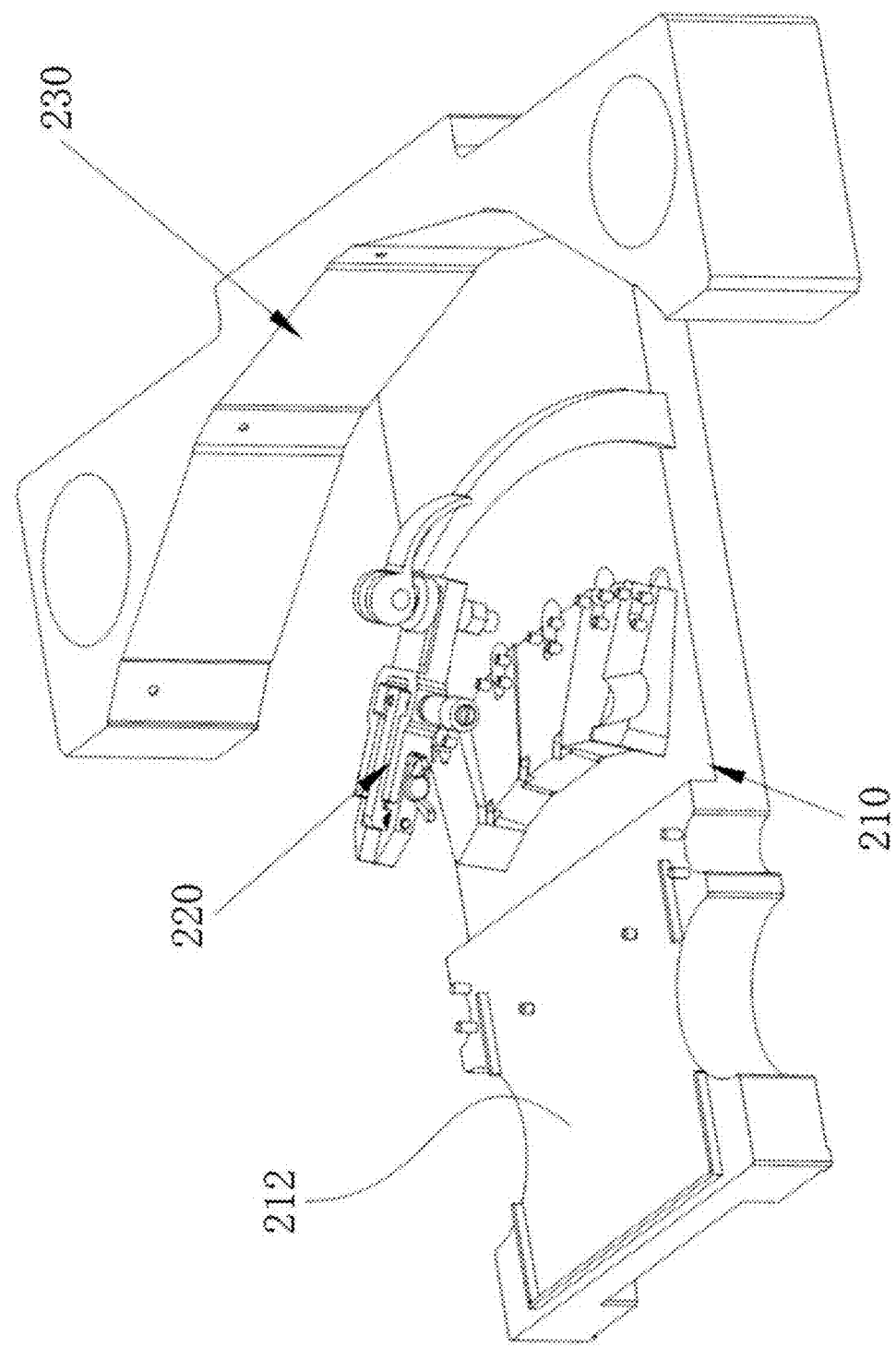
FIG. 24 shows an exploded schematic diagram of tooling according to an embodiment of this application.

As shown in FIGS. 19-20, a fourth aspect of this application also provides an intelligent driving apparatus 10. The intelligent driving apparatus 10 includes the LiDAR 100 in any of the foregoing embodiments. In some embodiments, the intelligent driving apparatus 10 can be a car. When the intelligent driving apparatus 10 is a car, the intelligent driving device 10 also includes a car body 200. The LiDAR 100 is mounted on the outer part of the car body 200 or embedded in the car body 200. When the LiDAR 100 is mounted outside the car body 200, the LiDAR 100 is preferably mounted on the roof of the car body 200.

In all the foregoing embodiments, a mirror adjusting device capable of adjusting the position of a mirror is disclosed. The mirror adjusting device in the foregoing embodiments can adjust the position of the mirror, but it is difficult to ensure the adjustment accuracy. To improve the adjustment accuracy of the position of the mirror, referring to FIGS. 21-27, the following also provides tooling for adjusting the position of the mirror. The tooling can adjust the position of the mirror separately during the assembly process of the mirror, and can also cooperate with the mirror adjusting device in the previous embodiment to adjust the position of the mirror together. When the tooling adjusts the position of the mirror separately, after the position adjustment of the mirror is completed, the position of the mirror needs to be fixed with a fixing component (such as an adhesive, etc.). When the tooling cooperates with the mirror adjusting device in the foregoing embodiments to adjust the position of the mirror together, the mirror is immediately fixed after the position adjustment of the mirror is completed.

In some embodiments, as shown in FIGS. 21-27, a fifth aspect of this application also provides tooling for adjusting the mirror. The tooling includes a fixing base 210 and an adjusting assembly 220. The fixing base 210 has a positioning structure. The positioning structure is configured to position the fixing device 240. The fixing device 240 is a device configured to fix the mirror 121. For example, in the LiDAR, the mirror 121 needs to be fixed inside the LiDAR. If the position of the mirror 121 relative to a housing is adjusted, the entire housing of the LiDAR can be regarded as the fixing device 240.

The adjusting assembly 220 is mounted at the fixing base 210. The adjusting assembly 220 includes a positioning portion 221 and a connecting portion 222. The positioning portion 221 is configured to fix the mirror 121. The connecting portion 222 is connected to the fixing base 210 and the positioning portion 221, respectively. The adjusting assembly 220 is configured such that the relative positions of the connecting portion 222 and the positioning portion 221 can be adjusted. Therefore, the position of the mirror 121 relative to the fixing device 240 can be adjusted by adjusting the position of the positioning portion 221 relative to the connecting portion 222. That is, the arrangement position of the mirror 121 relative to the fixing device 240 needs to be adjusted. In some embodiments, the fixing device 240 is first fixed on the fixing base 210. The position of the mirror 121 relative to the fixing base 210 is adjusted with the adjusting assembly 220 connected to the mirror 121 and the fixing base 210. The position of the adjusting mirror 121 relative to the fixing device 240 is further adjusted. In addition, during the adjustment process, the positioning portion 221 of the adjusting assembly 220 first positions the mirror 121, and then adjusts the position of the mirror 121 by adjusting the relative position of the connecting portion 222 and the positioning portion 221. Compared with the manual adjustment of the position of the mirror 121 in the prior art, a solution of adjusting the position of the mirror 121 after positioning the mirror 121 by means of tooling has higher adjustment accuracy.

It should be noted that the foregoing "positioning portion 221 is configured to fix the mirror 121" includes the positioning portion 221 to directly contact the mirror 121 to position the mirror 121, and also includes the positioning portion 221 to fix the mirror 121 via an intermediate object. For example, the positioning portion 221 is connected to the middle object. The mirror 121 is fixed to the intermediate object, that is, the positioning portion 221 is configured to fix the mirror 121. Similarly, the foregoing "positioning structure is configured to position the fixing device 240" includes: a positioning structure directly positions the fixing device 240 or indirectly positions the fixing device 240. In some embodiments, when the adjusting assembly 220 adjusts the position of the mirror 121, the mirror 121 can be adjusted to move or rotate, and mirror 121 can be adjusted to move while rotating. No matter in which manner the adjusting assembly 220 can adjust the mirror 121 to move, it is considered that the adjusting assembly 220 can adjust the position of the mirror 121.

For convenience, the mirror 121 is adjusted to a specific angle with the fixing device 240. In some embodiments, the fixing base 210 can further include an adjusting boss 211. The adjusting boss 211 includes an adjusting surface 2111. The connecting portion 222 is connected to the adjusting surface 2111. In this way, when the adjusting boss 211 is designed, the adjusting surface 2111 and the fixing base 210 can be at a specific angle, so that after the adjusting assembly 220 is mounted at the adjusting surface 2111, the positioning portion 221 can fix the mirror 121 at a preset angular position, thereby facilitating the adjustment of the mirror 121.

When the LiDAR has the plurality of mirrors 121 for reflecting laser, the tooling in this application can include the same number of adjusting assemblies 220 as the mirrors 121. Each adjusting assembly 220 is connected to the fixing base 210. Each adjusting assembly 220 is connected to each mirror 121 in a one-to-one correspondence to adjust the position of each mirror 121 relative to the fixing device 240 correspondingly. Similarly, the fixing base 210 can also include the same number of adjusting bosses 211 as the adjusting assemblies 220. Each adjusting boss 211 includes one adjusting surface 2111. Each adjusting surface 2111 and the fixing base 210 are at a specific angle. Each adjusting assembly 220 is connected to the adjusting surfaces 2111 in a one-to-one correspondence.

Figure 25:
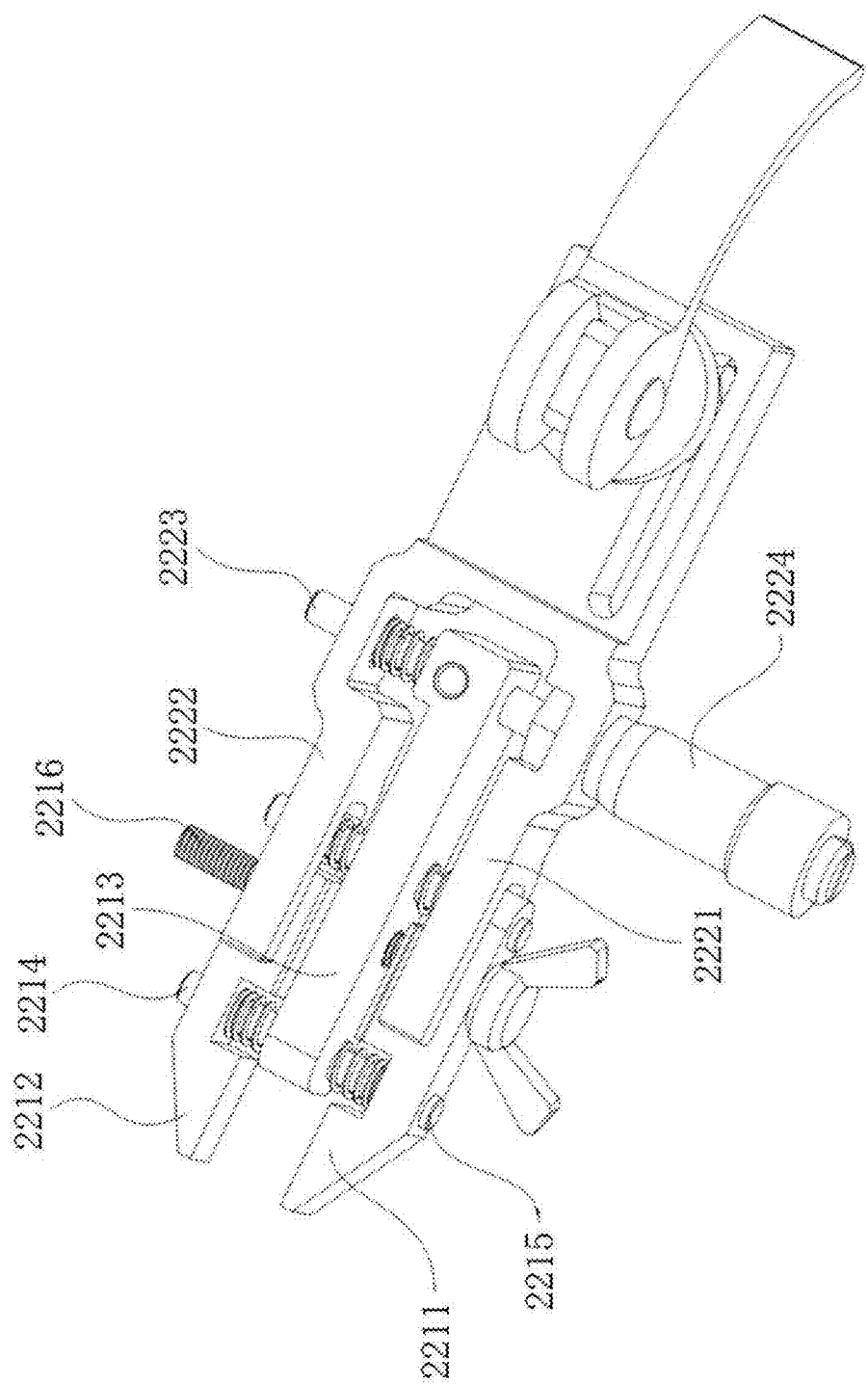
FIG. 25 shows a perspective diagram of an adjusting assembly according to an embodiment of this application.
Figure 26:
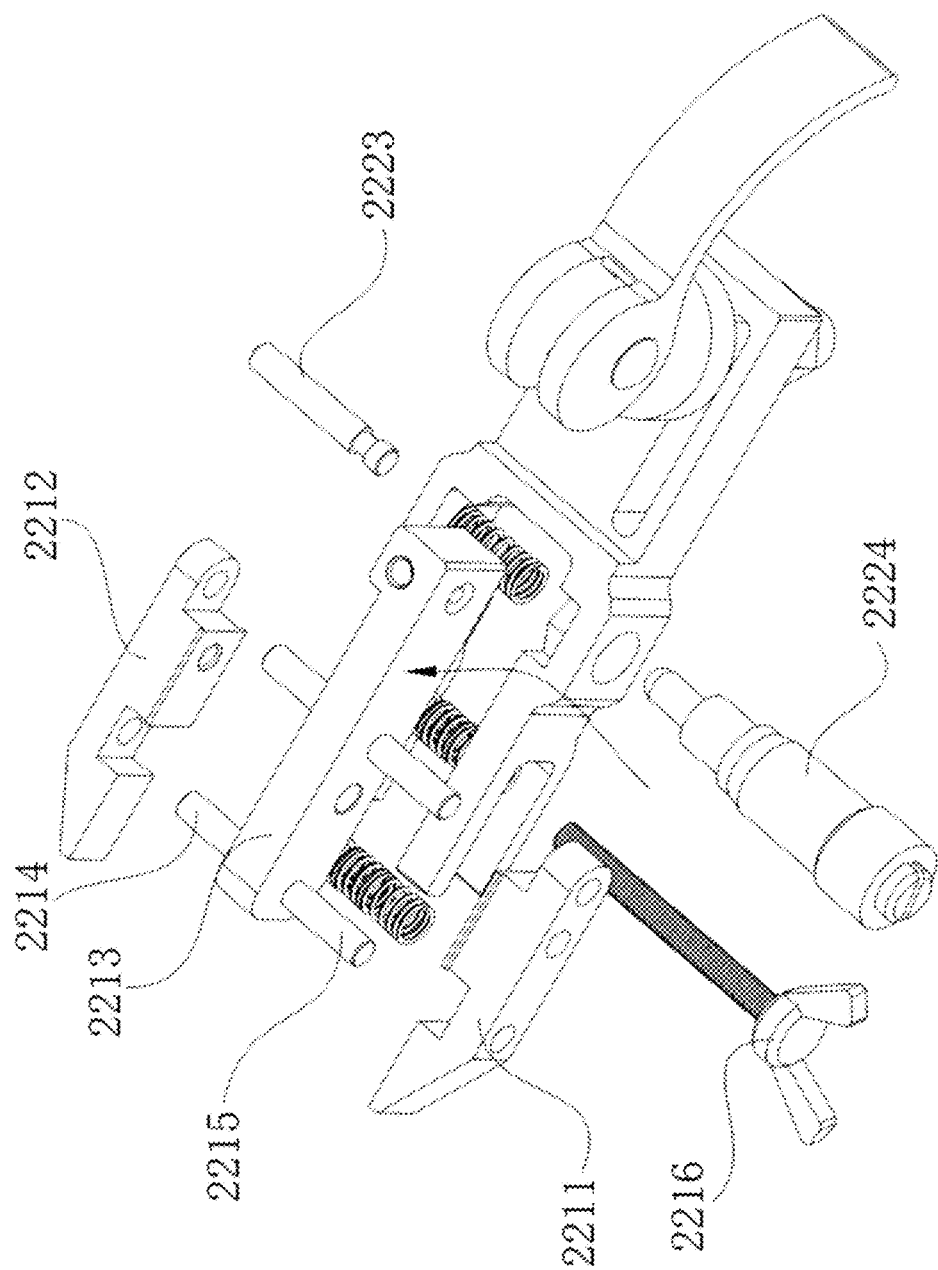
FIG. 26 shows a first exploded schematic diagram of an adjusting assembly according to an embodiment of this application.
Figure 27:
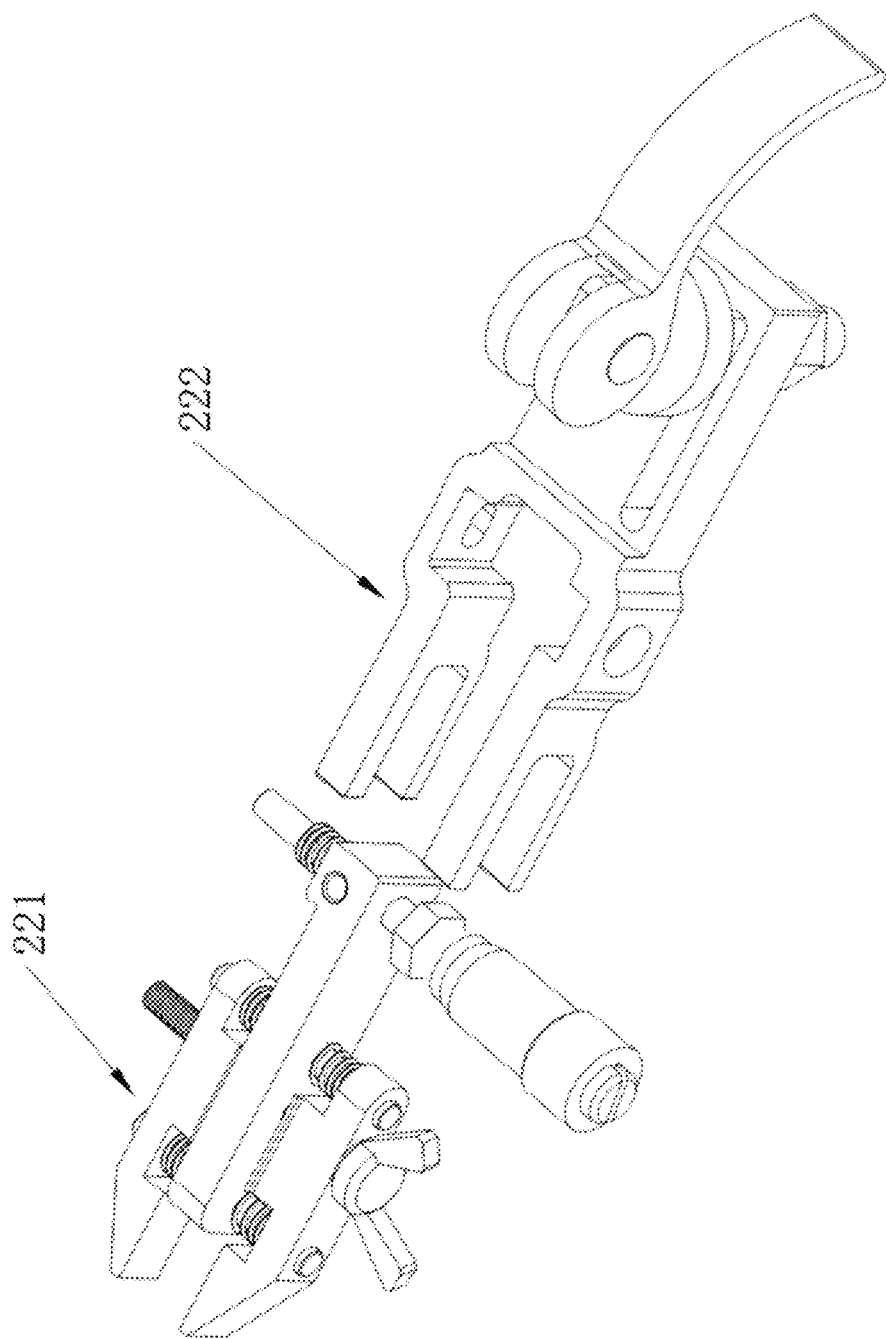
FIG. 27 shows a second exploded schematic diagram of an adjusting assembly according to an embodiment of this application.

As shown in FIGS. 25 to 26, the positioning portion 221 includes a first clamping block 2211, a second clamping block 2212, and an intermediate connecting block. The first clamping block 2211 and the second clamping block 2212 are elastically connected to the intermediate connecting block. The first clamping block 2211 and the second clamping block 2212 are configured to clamp the mirror 121 and the fixing device 240. That is, the positioning portion 221 can elastically clamp the mirror 121. In other embodiments, the positioning portion 221 can also fix the mirror 121 in other ways, such as snap-fitting connection with the mirror 121, bonding with the mirror 121, and the like.

The intermediate connecting block includes a first block body 2213. The first block body 2213 includes a first side wall 2217 and a second side wall opposite to the first side wall 2217. A first guide post 2215 is provided on the first side wall 2217. A second guide post 2214 is provided on the second side wall. The first block body 2213 is also provided with a through hole penetrating through the first side wall 2217 and the second side wall. The first clamping block 2211 is provided with a first guide hole. The first guide post 2215 extends into the first guide hole. The second clamping block 2212 is provided with a second guide hole. The second guide post 2214 extends into the second guide hole. The positioning portion 221 further includes a threaded connecting member 2216. The threaded connecting member 2216 passes through the first clamping block 2211, the through hole, and the second clamping block 2212, respectively. The threaded connecting member 2216 is configured to adjust a distance from the first clamping block 2211 to the second clamping block 2212 via rotation. In the above structure, the first guide post 2215 and the second guide post 2214 can guide the first clamping block 2211 and the second clamping block 2212, respectively, so that during a process that the first clamping block 2211 and the second clamping block 2212 clamp the mirror 121, the rotation of the mirror 121 can be restricted, thereby facilitating precise positioning of the mirror 121.

To further define the first clamping portion and the second clamping portion, two first guide posts 2215 can be provided on the first side wall 2217. Two second guide posts 2214 can be provided on the second side wall. Two first guide holes are provided on the first clamping clock 2211. Two second guide holes are provided on the second clamping block 2212. Each first guide post 2215 passes through each first guide hole in a one-to-one correspondence. Each second guide post 2214 passes through each second guide hole in a one-to-one correspondence. In other embodiments, the number of the first guide post 2215, the second guide post 2214, the first guide hole, and the second guide hole can also be more than two.

Both the first clamping block 2211 and the second clamping block 2212 are elastically connected to the intermediate connecting block. In some embodiments, a first elastic member is provided on the first guiding post 2215. The first elastic member is configured to press against the first clamping block 2211 and the first block body 2213, respectively, to generate a pushing force for pushing the first clamping block 2211 away from the first block body 2213. A second elastic member is provided on the second guiding post 2214. The second elastic member is configured to press against the second clamping block 2212 and the first block body 2213, respectively, to generate a pushing force for pushing the second clamping block 2212 away from the first block body 2213. In this way, the positioning portion 221 can be adapted to the mirrors 121 of different sizes, that is, the mirror 121 whose size varies within a certain range can be fixed by the positioning portion 221. Both the first elastic member and the second elastic member can be a spring, an elastic sheet, silicone, or other elastic devices.

As shown in FIG. 25, the connecting portion 222 includes a first connecting arm 2221 and a second connecting arm 2222 arranged opposite to the first connecting arm 2221. The first block body 2213 is arranged between the first connecting arm 2221 and the second connecting arm 2222. A first through hole is provided on the first connecting arm 2221. A second through hole is provided on the second connecting arm 2222. The connecting portion 222 further includes a threaded pusher 2224, The threaded pusher 2224 passes through the first through hole to abut against the first block body 2213. The threaded pusher 2224 is configured to push the first block body 2213 to be close to the end of the threaded pusher and move toward the traveling direction of the threaded pusher 2224. The first block body 2213 is further provided with a third guide hole. The connecting member further includes a third guide post 2223. The third guide post 2223 penetrates through the second through hole and extends into the third guide hole. When rotating, the threaded pusher 2224 moves against the end of the first block body 2213, and then the first block body 2213 moves or rotates as a whole, and finally drives the mirror 121 to move or rotate. Therefore, the position of the mirror 121 can be adjusted by rotating the threaded pusher 2224. Since the structure of the threaded pusher 2224 to adjust the position of the mirror 121 has an effect similar to a worm gear, an adjustment stroke can be enlarged. Therefore, the position adjustment of the mirror 121 is more accurate, and the position adjustment error is smaller.

As shown in FIG. 25, the third guide post 2223 is connected to a third elastic member. One end of the third elastic member abuts against the second connecting arm 2222, and the other end abuts against the first block body 2213. In this way, when the threaded pusher 2224 pushes the first block body 2213, the third elastic member can co-locate the first block body 2213 with the threaded pusher 2224. When the threaded pusher 2224 retracts (that is, the threaded pusher 2224 moves in a direction away from the first block body 2213), the third elastic member can also push the first block body 2213 to abut against the threaded pusher 2224.

In some embodiments, the end of the first connecting arm 2221 away from the threaded pusher 2224 is provided with a first notch. The first notch penetrates in a direction in which the first connecting arm 2221 points to the second connecting arm 2222. The end of the first clamping block 2211 close to the first connecting arm 2221 is arranged in the first notch and positioned by the first notch. The end of the second connecting arm 2221 away from the threaded pusher 2224 is provided with a second notch. The second notch penetrates in a direction in which the first connecting arm 2221 points to the second connecting arm 2222. The end of the second clamping block 2212 close to the second connecting arm 2222 is arranged in the second notch and positioned by the second notch.

In some embodiments, the surface of the first block body 2213 connected to the threaded pusher 2224 is provided with a groove structure. The end of the threaded pusher 2224 connected to the first block body 2213 extends into the groove structure, such that the threaded pusher 2224 does not slip on the first block body 2213.

In some embodiments, when the tooling is used in the LiDAR, the tooling can also include a reflecting adjusting assembly 230. The reflecting adjusting assembly 230 is configured to reflect laser, and serves as a detected object during the adjustment of the position of the mirror 121. In some embodiments, the reflecting adjusting assembly 230 has the same number of reflecting surfaces as the mirrors 121. Each reflecting surface reflects an emergent laser (the laser emitting to an object to be detected) and a reflected laser (the laser reflected back by the object to be detected) emitted from the mirror 121 in a one-to-one correspondence.

The same or similar reference signs in the drawings correspond to the same or similar components. In the description of this application, it should be understood that if terms "upper," "lower," "left," "right," etc., indicating orientation or positional relationship are based on the orientation or positional relationship shown in the drawings, the terms are only for the convenience of describing the application and simplifying the description, but does not indicate or imply that the device or element should have a specific orientation or is constructed and operated in a specific orientation. Therefore, the terms describing the positional relationship in the drawings are only used for exemplary description, and cannot be understood as a limitation of the disclosure. For the person skilled in the art, the meaning of the foregoing terms can be understood according to specific circumstances.

The foregoing embodiments are only exemplary embodiments of this application and are not intended to limit this application. Any modification, equivalent replacement and improvement made within the spirit and principle of this application shall be included within the protection scope of this application.

What is claimed is:

1. A mirror adjusting device, comprising:
a mounting bracket, provided with a mirror mounting structure for mounting a mirror at one side thereof and an adjusting part at the opposite side thereof, wherein the adjusting part comprises a first curved wall protruding in a direction away from the mirror mounting structure, and a middle of the first curved wall is provided with a connecting structure;
a fixing bracket, provided with a groove at one side thereof, wherein the groove comprises a second curved wall recessed toward the other side of the fixing bracket, an other side of the fixing bracket comprises a through hole penetrating through the second curved wall, and the first curved wall abuts against the second curved wall; a side of the fixing bracket facing away from the groove is provided with a third curved wall protruding away from the groove; and
an elastic assembly, comprising an elastic member and a connecting member, wherein the elastic member abuts against a surface wall of the fixing bracket away from the groove, one end of the connecting member is connected to the elastic member, and an other end of the connecting member passes through the through hole to be connected to the connecting structure, the elastic member comprises at least three elastic sheets, one end of each elastic sheet is connected to one end of the connecting member facing away from the adjusting part, and the other end of the connecting member abuts against the third curved wall,
wherein the adjusting part is rotatable about at least two intersecting axes relative to the fixing bracket, during the rotation of the adjusting part relative to the fixing bracket, the elastic member is configured to provide the adjusting part with a pressing force against the second curved wall via the connecting member, and the pressing force is configured to fix the fixing bracket and the adjusting part.

2. The mirror adjusting device according to claim 1, wherein
at least one of the first curved wall, the second curved wall, or the third curved wall is spherical.

3. The mirror adjusting device according to claim 1, wherein
the end of each elastic sheet facing away from the connecting member is provided with a contact point protruding toward the third curved wall, respectively, and each contact point abuts against the third curved wall, respectively.

4. The mirror adjusting device according to claim 1, wherein
the connecting member is a threaded connecting member, and the threaded connecting member is in threaded connection with a connecting structure.

5. The mirror adjusting device according to claim 1, further comprising:
a base, connected to the fixing bracket and configured to connect the mirror adjusting device to an external component.

6. The mirror adjusting device according to claim 1, further comprising:
a fixing glue, connected to the fixing bracket and the elastic member, and configured to fix the elastic member and the fixing bracket.

* * * * *